United States Patent
Gehlsen et al.

(10) Patent No.: US 6,638,985 B2
(45) Date of Patent: Oct. 28, 2003

(54) UNIFORM SMALL CELL FOAMS AND A CONTINUOUS PROCESS FOR MAKING SAME

(75) Inventors: Mark David Gehlsen, Eagan, MN (US); David Loren Vall, Woodbury, MN (US); Craig Allen Perman, Woodbury, MN (US); Bonnie Weiskopf Albrecht, Lake Elmo, MN (US)

(73) Assignee: 3M Innovative Properties Co., St. Paul, MN (US)

( * ) Notice: Subject to any disclaimer, the term of this patent is extended or adjusted under 35 U.S.C. 154(b) by 0 days.

(21) Appl. No.: 09/994,417

(22) Filed: Nov. 27, 2001

(65) Prior Publication Data

US 2002/0169224 A1 Nov. 14, 2002

Related U.S. Application Data

(62) Division of application No. 09/301,647, filed on Apr. 28, 1999.

(51) Int. Cl.[7] .................................................. C08J 9/12
(52) U.S. Cl. .......................... 521/79; 521/97; 264/51; 264/176.1
(58) Field of Search ....................... 156/79, 78; 264/51, 264/176.1; 521/134, 79, 97

(56) References Cited

U.S. PATENT DOCUMENTS

| 3,140,266 A | 7/1964 | Peticolas | 260/2.5 |
|---|---|---|---|
| 3,227,664 A | 1/1966 | Blades et al. | 260/2.5 |
| 3,663,668 A | 5/1972 | Fairbanks | 264/23 |
| 4,107,247 A | 8/1978 | Dukess | 264/45.9 |
| 4,436,679 A | 3/1984 | Winstead | 264/40.3 |
| 4,473,665 A | 9/1984 | Martini-Vvedensky et al. | 521/79 |
| 4,518,557 A | 5/1985 | Wecker | 264/45.9 |
| 4,761,256 A | 8/1988 | Hardenbrook et al. | 264/45.5 |
| 4,762,860 A * | 8/1988 | Park | 521/88 |
| 5,008,296 A | 4/1991 | Antoon et al. | 521/91 |
| 5,158,986 A | 10/1992 | Cha et al. | 521/82 |
| 5,160,674 A | 11/1992 | Colton et al. | 264/50 |
| 5,225,451 A | 7/1993 | Rogers et al. | 521/94 |
| 5,250,577 A | 10/1993 | Welsh | 521/79 |
| 5,266,605 A | 11/1993 | Welsh | 521/146 |

(List continued on next page.)

FOREIGN PATENT DOCUMENTS

| EP | 0 610 953 | | 8/1994 | |
|---|---|---|---|---|
| EP | 0 707 935 A2 | | 4/1996 | |
| EP | 0 818 292 A | | 1/1998 | |
| JP | 2000-169802 | * | 6/2000 | C09J/7/02 |
| WO | WO 97/06935 | | 2/1997 | |
| WO | WO 98/08667 | | 3/1998 | |

OTHER PUBLICATIONS

Rudin, A. The Elements of Polymer Science and Engineering, 2nd Ed., Academic Press: New York, 1999, p. 399.*

Behravesh, Amir H.; Park, Chul B., and Venter, Ronald D.; *Challenge to the Production of Low–Density, Fine–Cell HDPE Foams Using $CO_2$*; Cellular Polymers, vol. 17, No. 5, Jan. 1, 1998; pp. 309–326.

Primary Examiner—James J. Seidleck
Assistant Examiner—Melanie Bissett
(74) Attorney, Agent, or Firm—Sean J. Edman

(57) ABSTRACT

A continuous method for making foams having uniform and/or small cell sizes and articles made with these foams are described. The method allows for adjusting or controlling cell size and cell size distribution by controlling temperature and/or blowing agent concentration. The foams feature small and/or uniform cell sizes and may be comprised of amorphous thermoplastic polymers, pressure sensitive adhesive compositions, and immiscible thermoplastic polymer compositions. A method for coextruding the foams is also described.

15 Claims, 14 Drawing Sheets

U.S. PATENT DOCUMENTS

| | | | |
|---|---|---|---|
| 5,334,356 A | 8/1994 | Baldwin et al. | 422/133 |
| 5,352,513 A | 10/1994 | Mrozinski et al. | 428/315.5 |
| 5,358,675 A | 10/1994 | Campbell et al. | 264/50 |
| 5,369,135 A | 11/1994 | Campbell et al. | 521/134 |
| 5,389,168 A | 2/1995 | Litchholt et al. | 156/77 |
| 5,476,589 A | 12/1995 | Bacino | 210/500.36 |
| 5,612,136 A * | 3/1997 | Everaerts et al. | 428/335 AK |
| 5,753,717 A | 5/1998 | Sanyasi | 521/74 |
| 5,824,400 A | 10/1998 | Petrakis et al. | 428/218 |
| 6,224,938 B1 * | 5/2001 | Bamba et al. | 427/208.4 |
| 6,306,537 B2 * | 10/2001 | Schubert | 429/54 |

\* cited by examiner

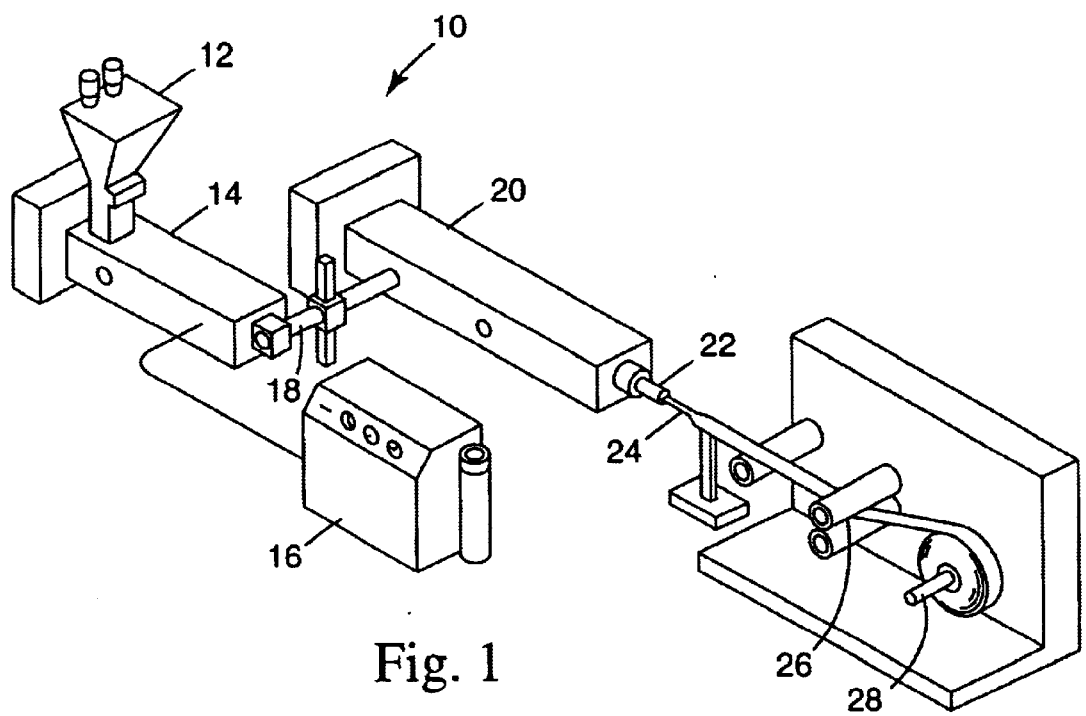
Fig. 1
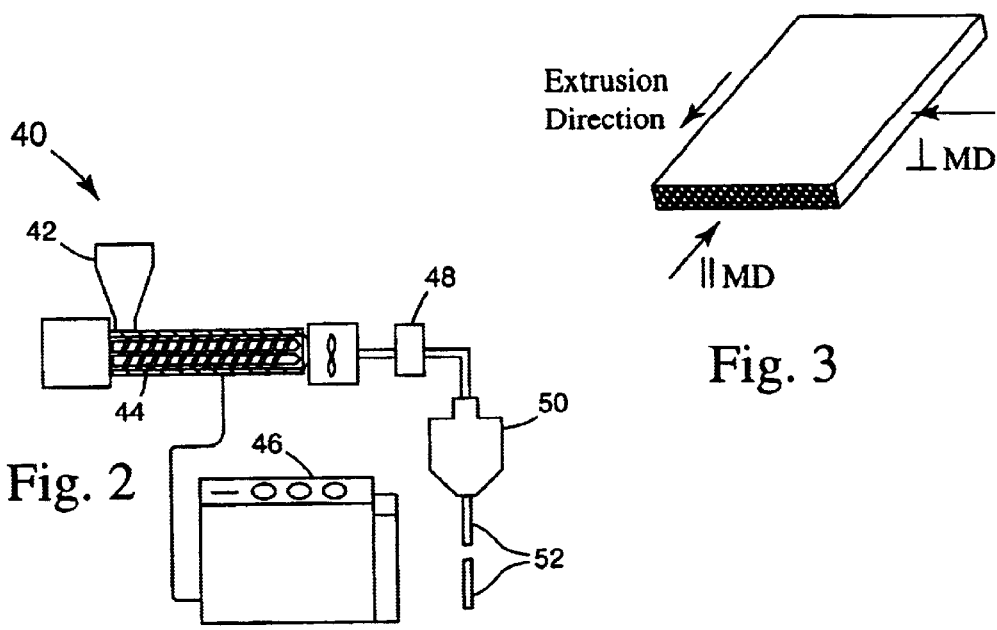
Fig. 2
Fig. 3

11 μm
P=1.04

96 °C

39 μm
P=1.80

99 °C

56 μm
P=1.60

117 °C

28 μm
P=1.02

101 °C

36 μm
P=1.03

107 °C

49 μm
P=1.02

112 °C

115 μm
P=1.11

122 °C

49 μm
P=1.02

6.2 Wt.%

84 μm
P=1.05

5.7 Wt.%

178 μm
P=1.03

4.4 Wt.%

7 μm
P=1.1

9 μm
P=1.05

23 μm
P=1.04

UNIFORM SMALL CELL FOAMS AND A CONTINUOUS PROCESS FOR MAKING SAME

This is a divisional of application Ser. No. 09/301,647 filed Apr. 28, 1999.

FIELD OF INVENTION

This invention relates to thermoplastic foams and foam articles having one or more of the following properties: small cells, uniform cell sizes, pressure sensitive adhesive compositions, blended immiscible thermoplastic polymer compositions. The invention further relates to a method for making the foams and a method for coextruding the foams with other materials.

SUMMARY OF INVENTION

In one aspect, the present invention relates to continuous processes for producing foams. The processes can be used to produce foams comprised of amorphous thermoplastic polymers, including pressure sensitive adhesives, and blends of immiscible polymers. Another aspect of the invention is a process to coextrude the foams with other polymeric materials.

In one aspect, the present invention provides a continuous method for producing a foam material comprising:

(1) mixing at least one amorphous thermoplastic polymeric material and at least one physical blowing agent in an apparatus having an exit shaping orifice at a temperature and pressure sufficient to form a melt solution wherein the blowing agent is uniformly distributed throughout the polymeric material;

(2) reducing the temperature of the melt solution at the exit of the apparatus to an exit temperature that is equal to or less than 30° C. above the glass transition temperature of the neat polymeric material while maintaining the melt solution at a pressure sufficient to keep the blowing agent in solution; and (3) passing the solution through the exit shaping orifice and exposing the solution to atmospheric pressure, thereby causing the blowing agent to expand resulting in nucleation and cell formation, which causes the melt solution to foam at or about the time it exits the shaping orifice.

In another aspect, the invention provides foam-containing articles that can be designed to exhibit a wide range of properties for a myriad of applications. The polymeric materials used in making the articles may comprise amorphous thermoplastic polymers including pressure sensitive adhesives, and blends of immiscible thermoplastic polymers. A range of suitable exit temperatures may be determined based on the polymeric material used to make the foam.

In another aspect, the invention further provides a way to control the cell size and cell size distribution of a foam by adjusting, manipulating, or controlling the blowing agent concentration, the exit temperature, and/or the exit pressure of the foamable melt solution.

In another aspect, the invention features articles comprising a foam having cell sizes of 2 to 200 micrometers, preferably 5 to 50 micrometers. The foam may alternatively, or additionally, have a cell size distribution with a polydispersity from 1.0 to 2.0, preferably from 1.0 to 1.5, more preferably from 1.0 to 1.2.

In another aspect, the invention features articles wherein the foam of the invention comprises at least one layer in a multi-layer construction.

The invention further features a coextrusion process whereby a foam is coextruded with at least one other material, which may be a foamed or unfoamed material.

As used in this invention:

"small-cell foam" means a foam having cell sizes of 2 to 200 micrometers ($\mu$m), preferably 5 to 50 $\mu$m;

"closed-cell" means a foam material that contains substantially no connected cell pathways that extend from one outer surface through the material to another outer surface;

"operating temperature" means the temperature that must be achieved in the extrusion process, prior to the addition of the physical blowing agent, to melt all of the polymeric materials in the melt mix;

"$T_g$" means the glass transition temperature, i.e., the temperature at which a polymer changes from a fluid to a solid state;

"exit temperature" and "exit pressure" mean the temperature and pressure of the extrudate in the final zone or zones of the extruder and preferably in the die;

"average" means the arithmetic average, i.e., mean;

"standard deviation" means the "typical" deviation in cell size from the mean cell size; it is calculated using the following formula:

$$\sigma = \sqrt{\frac{\sum_{i=1}^{n}(x_i - \bar{x})^2}{n-1}}$$

where $\sigma$ is the standard deviation, $x_i$ is an observed cell size, $\bar{x}$ is the arithmetic average cell size, and n is the total number of cell size observations;

"melt solution" or "melt mixture" or "melt mix" means a melt-blended mixture of polymeric material(s), any desired additives, and blowing agent(s) wherein the mixture is sufficiently fluid to be processed through an extruder;

"neat polymer" means a polymeric material having no additives, and at standard temperature and pressure;

"nucleation" means a process by which a homogeneous solution of polymeric material and dissolved molecules of a species that is a gas under ambient conditions undergoes formations of clusters of molecules of the species that define "nucleation sites" from which cells will grow; i.e., it is a change from a homogeneous solution to a multi-phase mixture in which, throughout the polymeric material, sites of aggregation of at least several molecules of physical blowing agent are formed (if immiscible polymeric materials are used, the physical blowing agent will typically form single-phase solutions with one or more of the polymer materials, but the polymers will typically not combine to form a single phase);

"supercritical fluid" means a substance, which is typically a gas at ambient temperature and pressure, compressed to a state where it has the density and solvation characteristics of a liquid, but the viscosity, permeability, and diffusivity of a gas; a supercritical fluid is a single phase material that exists above a critical point, which point is determined by a critical temperature, $T_c$, and critical pressure, $P_c$, which $T_c$ and $P_c$ depend on the particular gas (for example, the $T_c$ and $P_c$ for carbon dioxide are approximately 31° C. and 7.4 MPa (1078 psia), respectively);

"foam density" means the weight of a given volume of foam;

"inversion temperature" means the temperature at which a minimum foam density is obtained for a given polymeric foam; at temperatures above and below the inversion temperature, a higher foam density will typically be obtained;

"density reduction" refers to a way of measuring the void volume of a foam based on the following formula:

$$\rho_R = \left[1 - \frac{\rho_f}{\rho_o}\right] \times 100\%$$

where $\rho_R$ is the density reduction, $\rho_f$ is the foam density, and $\rho_o$ is the density of the original material;

"polydispersity" means the weight average cell diameter divided by the number average cell diameter for a particular foam sample; it is a means of measuring the uniformity of cell sizes in the sample;

"uniform" means that the cell size distribution has a polydispersity of 1.0 to 2.0;

"spherical" means generally rounded; it may include spherical, oval, or circular structure;

"fibrillose" means having elongated filament-like or thread-like structures;

"schistose" means having parallel plate-like ribbons;

"polymer matrix" means the polymeric, or "non-cell," areas of a foam;

"blend matrix" means the polymeric material having the highest volume fraction in a melt mixture comprising at least two immiscible materials;

"immiscible" refers to thermoplastic polymers that will not mix or remain mixed with each other, although at certain conditions, such as high temperatures, they might mix, but any such mixture will typically be thermodynamically unstable and will typically separate into distinct phases at lower temperatures;

"miscible" refers to two or more thermoplastic materials that will form a homogeneous mixture, that is, dissolve in each other;

"anisotropic" means having different properties or degrees of properties in different directions parallel to a major surface; and "straight line tear" means a tear not deviating more than 20°, preferably not more than 10°, from the direction in which the tear is initiated.

An advantage of at least one embodiment of the present invention is the ability to alter, adjust, or control the foam density, average cell size, and cell size distribution of foams. This allows the properties of the produced foams to be optimized based on their intended use.

An advantage of at least one embodiment of the method of the present invention is that no special nucleation apparatus is required to nucleate the foam.

An advantage of at least one embodiment of a foam of the present invention is that uniform cell sizes can provide uniform characteristics and properties throughout the foam.

An advantage of at least one embodiment of a foam of the present invention is that small cells, as opposed to larger cells, will not as easily propagate defects or cracks in the foam structure. Another advantage of small cell sizes is that thinner foam substrates can be produced.

An advantage of at least one embodiment of a foam of the present invention is that a foam comprising a blend of thermoplastic materials can allow the foam to have beneficial properties of each material. For example, a foam combining a stiff and strong material with a flexible and weak material can have strength and flexibility. In addition, the foam may have anisotropic properties, which can be used advantageously. For example, a foam that has high tensile strength in one direction and flexibility in a perpendicular direction may be used for high strength substrates or backings.

Another advantage of at least one embodiment of a foam of the present invention is that the foams may have low and controlled dielectric constant and high dielectric strength.

An advantage of at least one embodiment of a foam of the present invention is the ability to be torn by hand in one or both of directions parallel and perpendicular to the machine direction wherein the tears are straight-line tears.

An advantage of at least one embodiment of the present invention comprising pressure sensitive adhesive materials is that the foam can possess pressure sensitive adhesive properties without requiring the application of a pressure sensitive adhesive layer to the foam surface.

An advantage of at least one embodiment of the present invention is the ability to produce coextruded foams from materials having disparate temperatures, while maintaining the structure of the foam. The coextruded foams can provide articles having a variety of desired properties.

An advantage of at least one embodiment of a foam of the present invention is that it can provide the insulating properties.

An advantage of at least one embodiment of a foam of the present invention is that it can provide the conformability and strength of a cloth without using an expensive woven material.

Other features and advantages of the invention will be apparent from the following figures, detailed description, and claims.

BRIEF DESCRIPTION OF DRAWINGS

FIG. 1 illustrates a tandem extruder system that may be used in a process of the present invention.

FIG. 2 illustrates a single twin screw extruder system that may be used in a process of the present invention.

FIG. 3 illustrates the direction in which a cross-section of a foam sample may be viewed in a micrograph. A sample may be viewed parallel to the machine direction, i.e., the extrusion direction, or perpendicular to the machine direction.

DETAILED DESCRIPTION

Figure 4C:
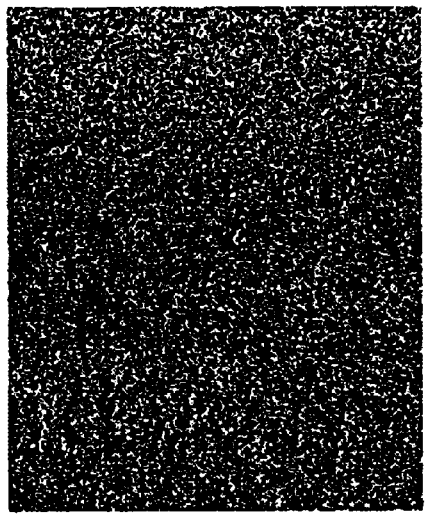
FIGS. 4a, 4b, and 4c show scanning electron microscope (SEM) micrographs (parallel to the machine direction) of polystyrene foams comprising PS615, a polystyrene available from Dow Chemical Co., Midland, Mich., produced at 117° C., 99° C., and 96° C., respectively, at a $CO_2$ concentration of about 7.3, 7.6, and 8.7 weight %, respectively, using a tandem extruder process wherein the first extruder was operated at 25 rpm and the second at 5 rpm.

One aspect of the present invention provides a continuous process for generating uniform and/or small cell thermoplastic foams using a tandem or two-stage extrusion system. This process involves mixing one or more thermoplastic polymeric materials with a physical blowing agent, e.g., carbon dioxide ($CO_2$), that is soluble with at least one of the polymeric materials, to form a melt solution. The temperature and pressure conditions in the extrusion system are preferably sufficient to maintain the polymeric material and blowing agent as a homogeneous solution. The blowing agent plasticizes, i.e., lowers the $T_g$ of, the polymeric material. The inventors have found that by adding a physical blowing agent, the polymeric materials may be processed and foamed at temperatures considerably lower than otherwise might be required. The lower temperature can allow the foam to cool and stabilize (i.e., reach a point of sufficient solidification to arrest further cell growth and coalescense) soon after it exits the die, thereby making it easier to arrest cell growth and coalescence while the cells are smaller and more uniform. Preferably, the polymeric materials are foamed at or below 30° C. above the glass transition temperature of the neat polymer thereby producing desirable properties such as uniform and/or small cell sizes. The glass transition temperature is that temperature below which free rotation of polymer molecules cease because of intermolecular forces; below its glass transition temperature, a polymer has a very high viscosity and is, for all practical purposes, a solid; above the glass transition temperature, the polymer is rubbery or fluid.

As the melt solution exits the extruder through a shaping die, it is exposed to the much lower atmospheric pressure causing the blowing agent to expand and come out of the melt solution. This causes nucleation and cell formation resulting in foaming of the melt solution. When the melt solution exit temperature is at or below 30° C. above the $T_g$ of the neat polymeric material, the increase in $T_g$ of the polymer as the blowing agent comes out of the solution causes vitrification of the polymer, which in turn arrests the growth and coalescense of the foam cells within seconds or, most typically, a fraction of a second. This preferably resulting in the formation of small and uniform voids in the polymeric material. When using exit temperatures further above the $T_g$ of the neat polymer, cooling of the polymeric material, and, therefore, arresting the growth and coalescence of cells may take longer. In addition to the increase in $T_g$, adiabatic cooling of the foam may occur as the physical blowing agent expands. The foams are typically and preferably fully formed at the exit of the die, as soon as the melt solution is exposed to ambient pressure.

Tandem Extrusion Process 10

FIG. 1 illustrates a tandem extrusion process that can be used to make the foams of the present invention. To form a melt solution of polymer and physical blowing agent, polymeric material is initially fed into a first extruder 14 (typically a single screw extruder) which softens and conveys the polymeric material. The polymeric material may be added to extruder 14 in any convenient form, including pellets, billets, packages, strands, and ropes. Additives are typically added with the polymer material but may be added further downstream. The physical blowing agent, typically in a liquid or supercritical form, is injected near the exit of the first extruder. Due to the conditions in the extruder, the physical blowing agent is typically in a supercritical state while in the extruder.

The polymer materials, additives, and blowing agent are melt-mixed in the first extruder 14. The purpose of the melt-mixing step is to prepare a foamable, extrudable composition in which the blowing agent and other additives, to the extent present, are distributed homogeneously throughout the molten polymeric material. Specific operating conditions are selected to achieve such homogeneous distribution based upon the properties and characteristics of the particular composition being processed. The operating and exit pressures in the extruder 14 should be sufficient to prevent the blowing agent from expanding thereby causing nucleation and cell formation in the extruder. The operating temperature in the extruder 14 should be sufficient to melt all of the polymers in the melt mix.

Next, the melt mix is fed to a second extruder 20 (typically a single screw extruder). The second extruder 20 is generally operated at conditions (e.g., screw speed, screw length, pressure, and temperature) selected to achieve optimum mixing, and to keep the blowing agent in solution. The extruder 20 typically has a decreasing temperature profile wherein the temperature of the last zone or zones will bring the melt solution to the desired exit temperature.

At the exit end of the second extruder 20, the foamable, extrudable composition is metered into a die 22 which has a shaping exit orifice (e.g., an annular, rod, slit die, or shaped profile die). The temperature within the die 22 is preferably maintained at substantially the same temperature as the last zone of the secondary extruder 20; i.e., at the exit temperature. The relatively high pressure within the extruder 20 and die 22 prevents nucleation, cell formation, and foaming of the melt mix composition in the extruder and die. Exit pressure is dependent upon die orifice size, exit temperature, blowing agent concentration, polymer flowrate, polymer viscosity, and polymer type. Exit pressure is typically controlled by adjusting the die orifice size, but can also be adjusted by altering the exit temperature, blowing agent concentration, and other variables. Reducing the size of the die orifice will generally increase exit pressure. As the composition exits die 22, through the die's shaping orifice, it is exposed to ambient pressure. The pressure drop causes the blowing agent to expand, leading to nucleation and cell formation thereby causing foaming of the melt solution composition at or about the time it exits the outer opening of the die exit shaping orifice, i.e., typically within a fraction of a second. The foam 24 is typically quenched, i.e., brought to a temperature below the $T_g$ of the polymeric material comprising the foam, within two centimeters to five of the die exit, more typically and preferably less than two centimeters, most preferably as the foamable material exits the die and is exposed to ambient pressure.

The shape of foam 24 is dictated by the shape of the die exit orifice. A variety of shapes may be produced, including a continuous sheet, including sheets with patterned profiles, a tube, a rope, etc. When it is extruded, the melt solution is at the exit temperature, a relatively low temperature compared to temperatures at which most extrusion processes are carried out. The exit temperature is chosen to allow the production of a foam with the desired cell size and cell size distribution, preferably at or below 30° C. above the glass transition temperature of the neat polymeric material. In general, as the blowing agent separates from the homogeneous solution into a distinct phase, its plasticizing effect on the polymeric material decreases and the glass transition temperature of the polymeric material increases. As the $T_g$ of the polymeric material approaches the $T_g$ of the neat polymeric material, the blowing agent can not as easily expand or coalesce because the polymeric material becomes more viscous. As the foam material cools further, it solidifies in the general shape of the exit shaping orifice of die 22.

Twin Screw Extrusion Process 40

FIG. 2 illustrates a twin screw extrusion process that can be used to make the foams of the present invention. A single twin screw extruder 44 may be used to form a melt solution of polymer and physical blowing agent. The polymeric material is introduced into zone 1 of extruder 44. Additives are typically added with the polymer but may be added further downstream. A blowing agent is preferably injected at a location downstream from a point at which the polymer has melted.

The extruder 44 is operated with a generally decreasing temperature profile. The temperature of the initial zone(s) of the extruder must be sufficient to melt the polymeric material (s) being used. The temperature of the final zone or zones of the extruder are set at temperatures to achieve the desired extrudate exit temperature.

Using a single twin screw extruder, as compared to using a tandem process, to produce a homogeneous foamable solution requires mixing and transitioning from an operating temperature and pressure to an exit temperature and pressure over a shorter distance. To achieve a suitable melt mix, approximately the first half of the extruder screw may have mixing and conveying elements which knead the polymer and move it through the extruder. The second half of the screw may have distributive mixing elements to mix the polymer material and blowing agent into a homogeneous mixture.

As with the tandem process, the operating and exit pressures (and temperatures) should be sufficient to prevent the blowing agent from expanding and causing nucleation and cell formation in the extruder. The operating temperature is preferably sufficient to melt the polymer materials, while the last zone or zones of the extruder are preferably at a temperature that will bring the extrudate to the exit temperature.

At the exit end of the extruder, the foamable, extrudable composition is metered into a die 50 having a shaping exit orifice. The foam is generated in the same manner as with the tandem system.

Coextrusion Process

The inventors found, unexpectedly, that they were able to coextrude the foams of the invention with materials having substantially higher processing temperatures from that of the foam, while still obtaining the desired structures and cell sizes. For example, the inventors were able to coextrude a foam at 93° C. and another polymer material at 204° C., a difference of over 110° C. It would be expected that exposing the foam to an adjacent hot polymer as it is extruded, might cause the foam cells, especially those in direct contact with the hotter material, to continue to grow and coalesce beyond their desired sizes or might cause the foam material to melt or collapse.

The coextrusion process of the present invention may be used to make a foam material comprising two layers or more. A layered material or article may be produced by equipping die 22 or 50 with an appropriate feed block, e.g., a multilayer feedblock, or by using a multi-vaned or multi-manifold die such as a 3-layer vane die available from Cloeren, Orange, Tex. Materials or articles having multiple adjacent foam layers may be made with foam layers comprising the same or different materials. Foam articles of the present invention may comprise one or more interior and/or exterior foam layer(s). In such a case, each extrudable, foamable material may be processed using one of the above-described extrusion methods wherein melt mixtures are fed to different inlets on a multi-layer feedblock, or multi-manifold die, and are brought together prior to exiting the die. The layers foam in generally the same manner as described above for the extrusion process. The multi-layer process can also be used to extrude the foam of this invention with other types of materials such as unfoamed polymeric materials and any other type of polymeric material. When a multi-layered article is produced, it is preferable to form adjacent layers using materials having similar viscosities and which provide interlayer adhesion.

If adjacent layers of materials are heated to substantially different temperatures, a die can be used that will thermally isolates the different materials until just prior to their exiting the die, for example the die disclosed in FIG. 4 of U.S. Pat. No. 5,599,602, incorporated by reference. This can diminish or eliminate negative effects of contacting the different materials such as melting or collapsing the foam or causing continued cell expansion coalescense.

Multilayer foam articles can also be prepared by laminating polymer or nonpolymer layers to a foam core, or by layering extruded foams as they exit their respective shaping orifices, with the use of some affixing means such as an adhesive. Other techniques that can be used include extrusion coating and inclusion coextrusion, which is described in U.S. Pat. No. 5,429,856, incorporated by reference.

Process Variables

The present invention shows that blowing agent concentrations, exit pressure, and exit temperature can have a significant effect on the properties of the resulting foams including foam density, cell size, and distribution of cell sizes. A degree of interdependence also exists between blowing agent concentrations, pressure, and temperature with regard to processing conditions. The inventors found, in general, that the lower the exit temperature, the more uniform, and smaller, the cell sizes of the foamed material. This is believed to be because the lower the exit temperature, the quicker the $T_g$ of the foaming material increases to the exit temperature as the blowing agent leaves the solution, thereby causing cell growth to be more quickly arrested. The inventors found that by extruding the material at lower than normal extrusion temperatures, preferably at or below 30° C. above the $T_g$ of the neat polymeric material, they were able to produce foams with small, uniform cell sizes.

The inventors found that varying the exit temperature of the melt solution while maintaining a relatively constant blowing agent concentration, (which is achieved by controlling the flow rate of the blowing agent in relation to the flow rate of the polymeric material) can cause a change in foam density. At the temperature ranges used by the inventors, foam density is, in general, inversely related to the change in exit temperature. This is shown, for example, by the general trend of the data in Table 1 and FIG. 16 (below about 125° C.).

In addition, as the exit temperature increases above the polymer $T_g$, the foam density typically decreases until the inversion temperature is reached. At that point a further increase in temperature typically produces an increase in foam density. Foams having a density of less than about 0.04 grams/cubic centimeter (g/cc) tend to be mechanically weak. By keeping the exit temperature of the extrudate near the $T_g$ of the neat polymer, the inventors were able to achieve desirable densities while still achieving small and/or uniform cell sizes. Densities of the foams of the invention may vary widely. In addition, materials providing high mechanical strength may be used to overcome weaknesses of low density foams. Foams having densities greater than 0.1 g/cc (gram per cubic centimeter) can also be made using a process of the invention. Typically densities of the foams produced in the examples were in the range of 0.1 g/cc to 0.3 g/cc. These densities provide foams with better mechanical properties than foams having lower densities. Some mechanical properties, such as compressive strength, can also be influenced by cell size. A smaller cell size will typically provide a higher compressive strength.

Figure 4B:
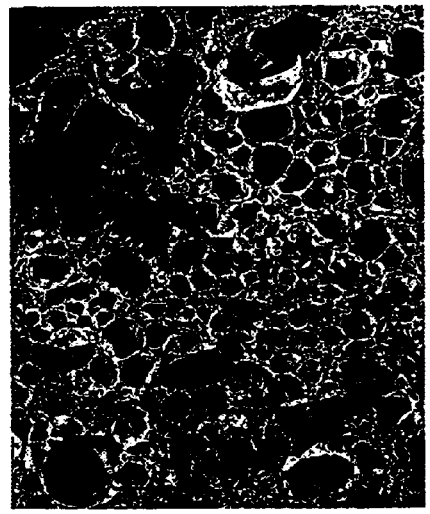
Figure 4A:
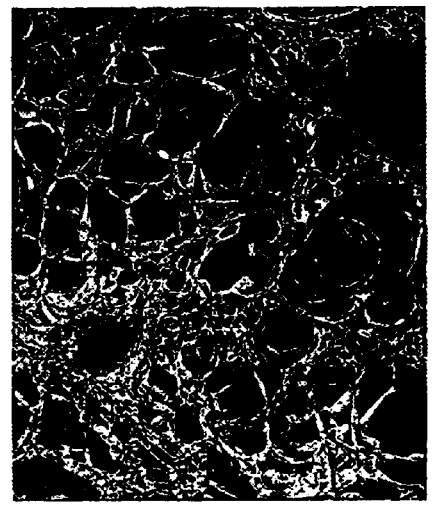
Figure 5:
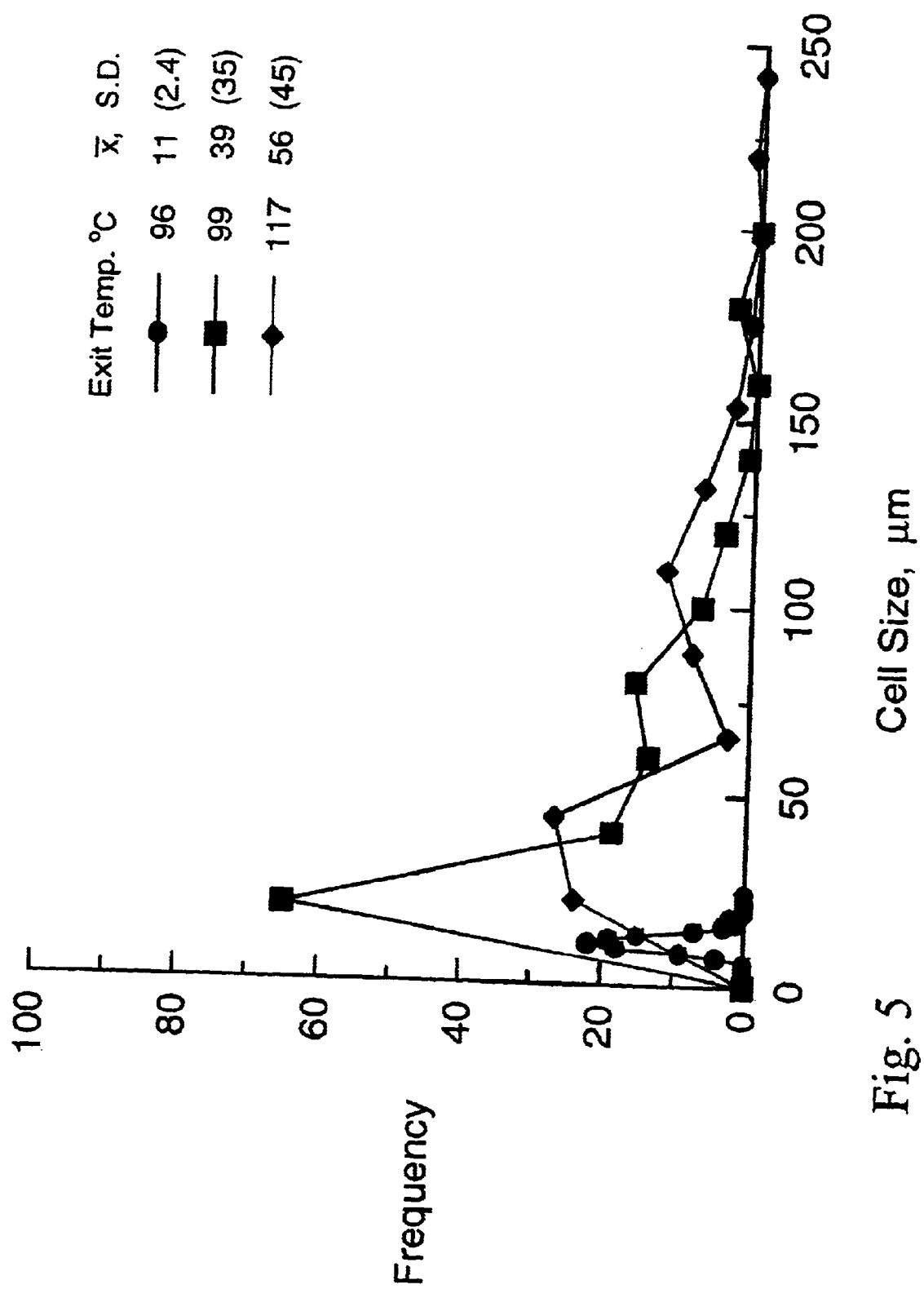
FIG. 5 is a cell histogram showing average cell size and standard deviation for polystyrene foams shown in FIGS. 4a–4c comprising PS615 produced at 117° C., 99° C., and 96° C. at a $CO_2$ concentration of about 7.3, 7.6 and 8.7 weight %, respectively.
Figure 6A:
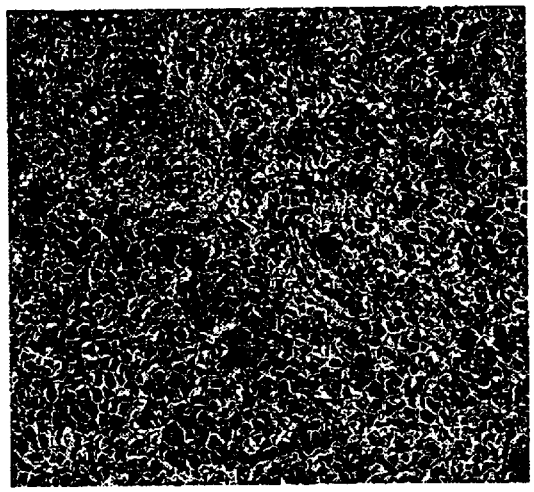
FIGS. 6a, 6b, 6c, and 6d show SEM digital image micrographs (parallel to the machine direction) of polystyrene foams comprising PS615 produced at temperatures of 101° C., 107° C., 112° C., and 122° C., respectively, at a $CO_2$ concentration of 6.8, 6.4, 6.2, 6.0 weight %, respectively, using a tandem extruder process wherein the first extruder was operated at 25 rpm and the second at 5 rpm.
Figure 6B:
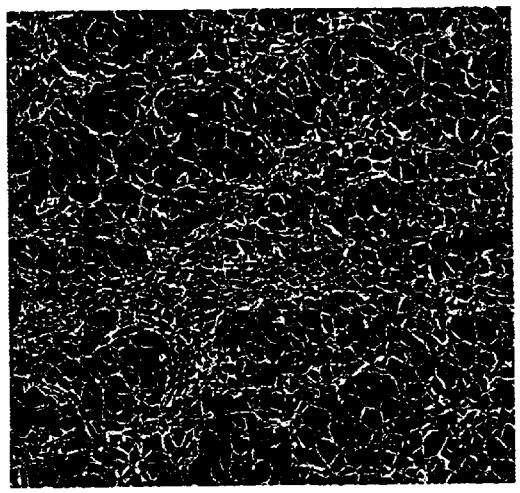
Figure 6C:
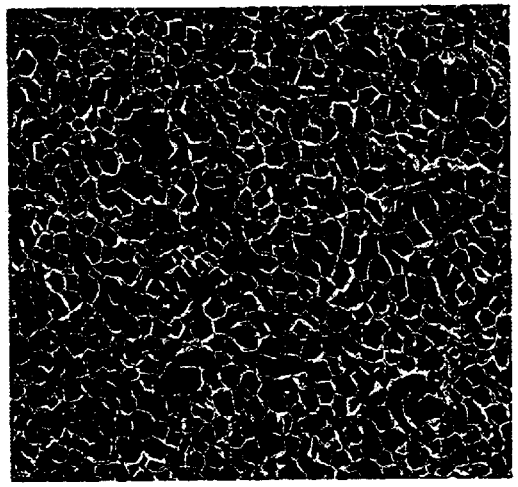
Figure 6D:
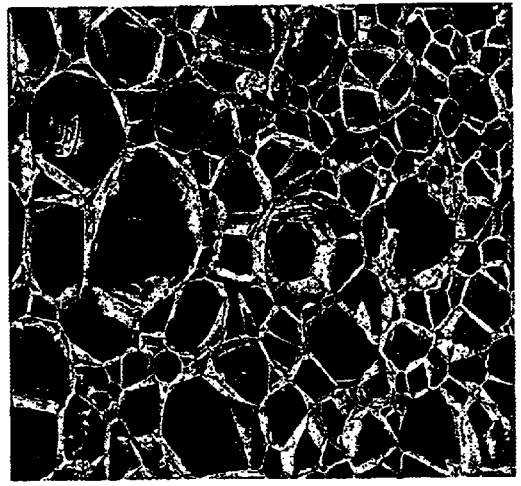
Figure 7:
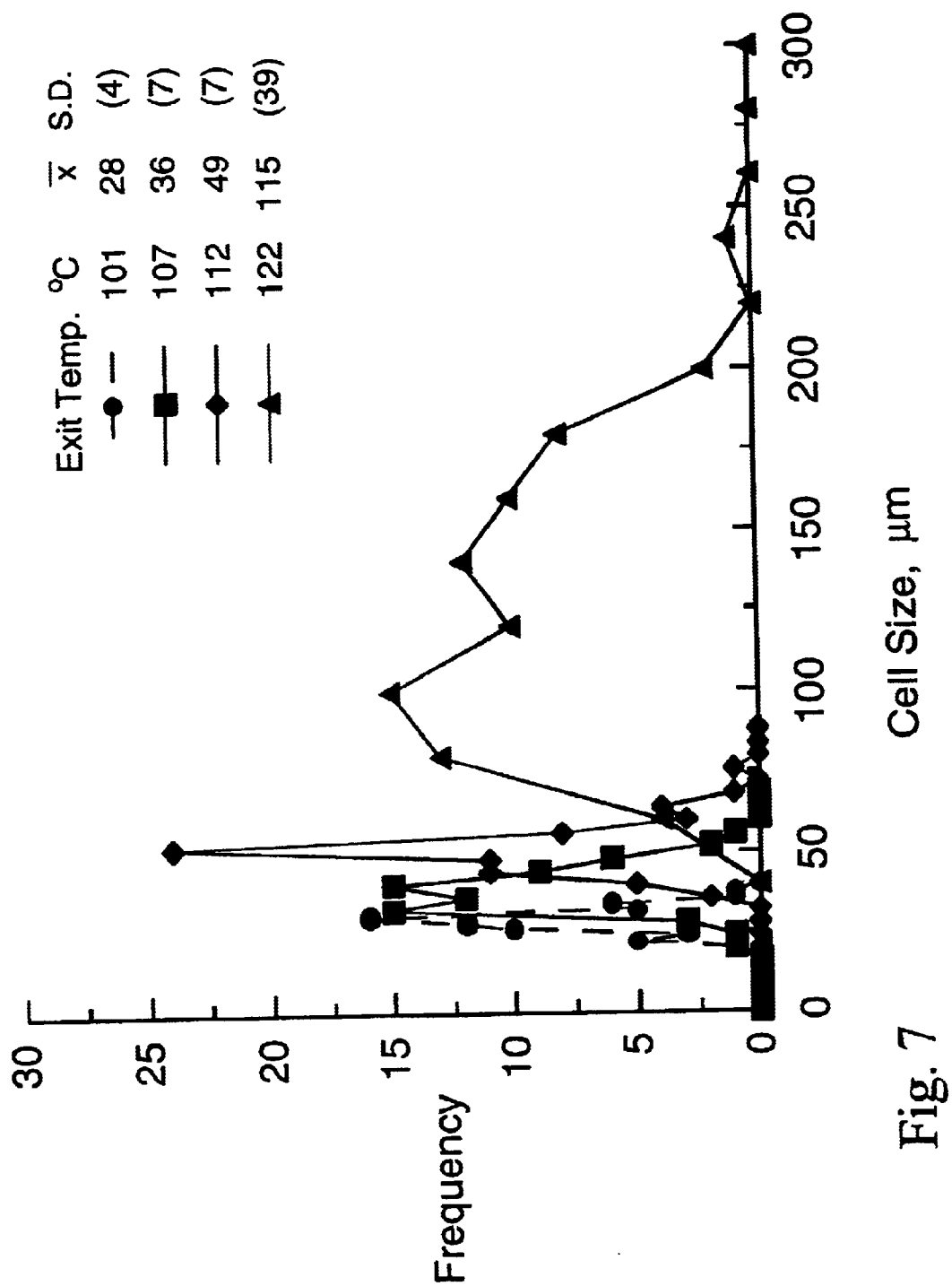
FIG. 7 is a cell histogram showing average cell size and standard deviation for polystyrene foams shown in FIGS. 6a–6d comprising PS615 produced at temperatures of 101° C., 107° C., 112° C., and 122° C. at a $CO_2$ concentration of 6.8, 6.4, 6.2, 6.0 weight %, respectively.
Figure 8C:
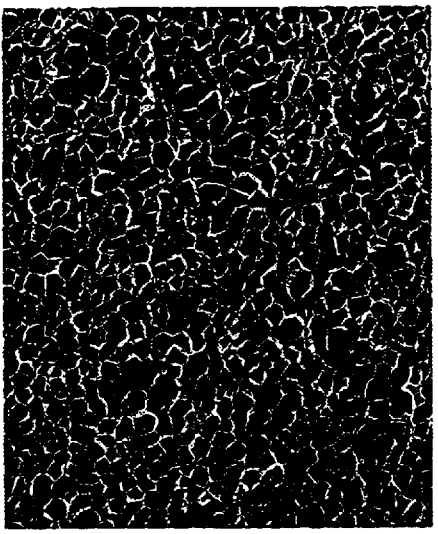
FIGS. 8a, 8b, and 8c show SEM digital image micrographs (parallel to the machine direction) of polystyrene foams comprising PS615 produced at $CO_2$ concentrations of 4.4, 5.7, and 6.2 weight % and exit temperatures of 118° C., 117° C., and 112° C., respectively, using a tandem extruder process wherein the first extruder was operated at 25 rpm and the second at 5 rpm.
Figure 8B:
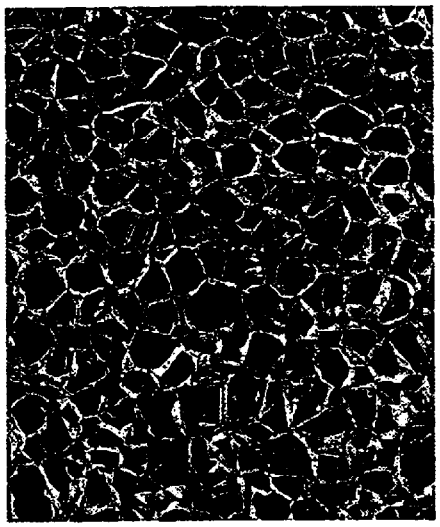
Figure 8A:
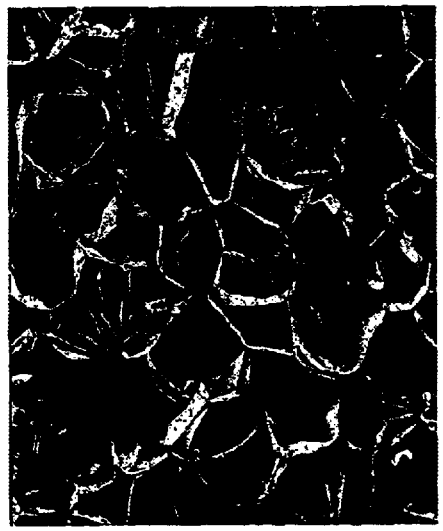
Figure 9:
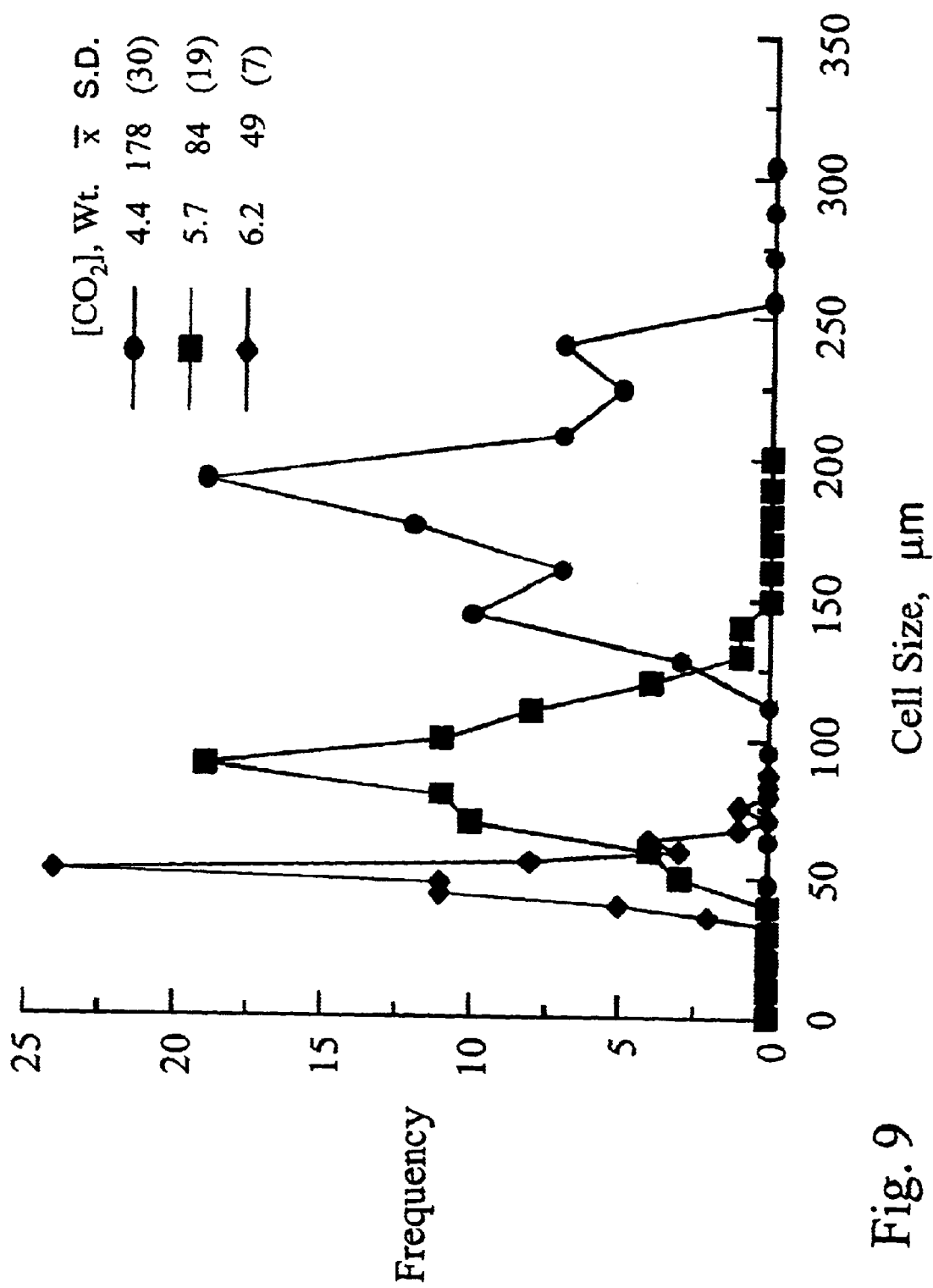
FIG. 9 is a cell size histogram showing average cell size and standard deviation for polystyrene foams shown in FIGS. 8a–8c comprising PS615 produced at 118° C., 117° C., and 112° C. with $CO_2$ concentrations of 4.4, 5.7, and 6.2 weight %, respectively.
Figure 13:
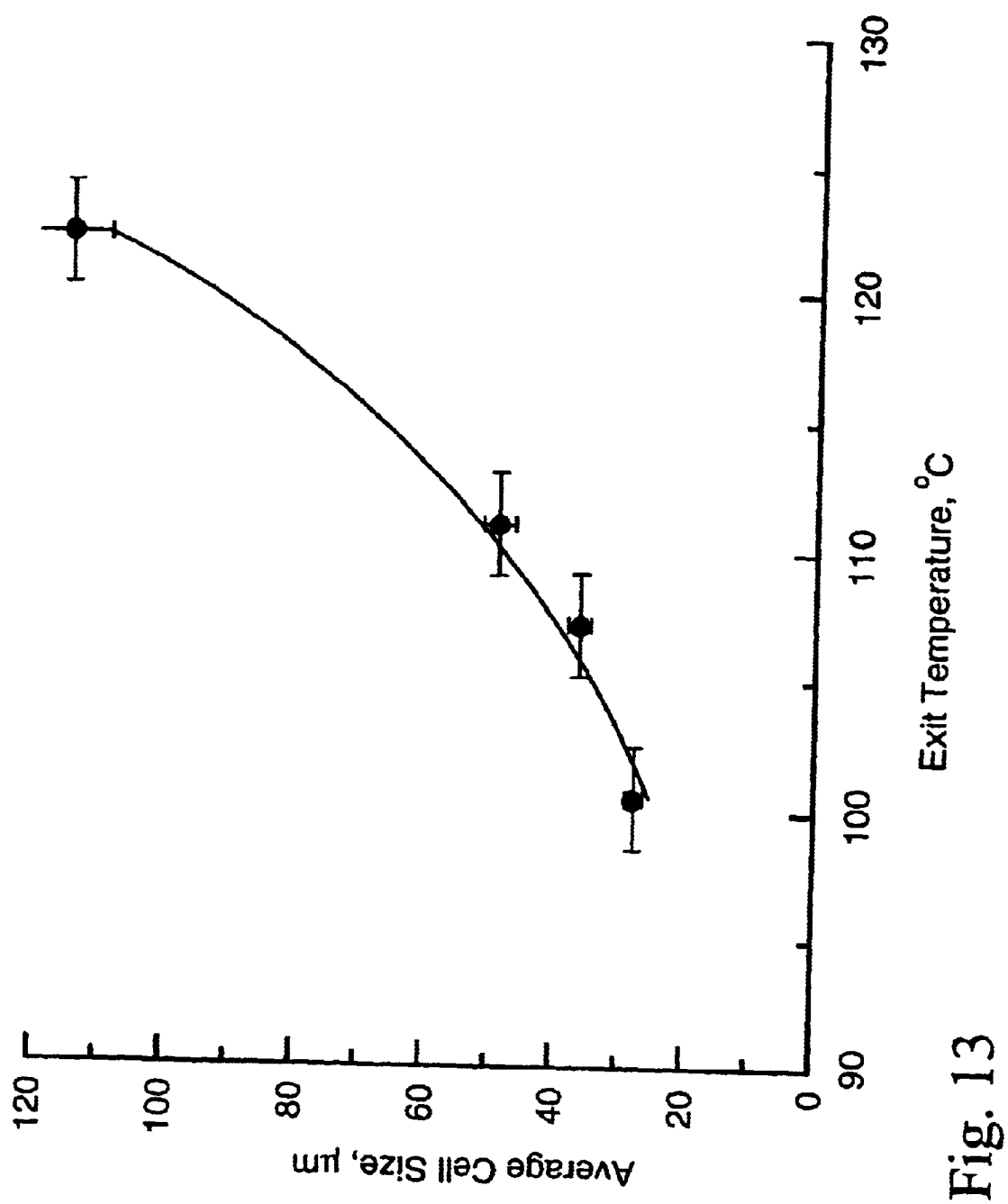
FIG. 13 shows the exponential relationship of average cell size to exit temperature for polystyrene foams comprising PS615 and produced at 6–7 wt % $CO_2$, made at various exit temperatures, using a tandem extruder process wherein the first extruder was operated at 25 rpm and the second at 5 rpm.

The inventors also found that varying the exit temperature at a relatively constant blowing agent concentration, can have a noticeable effect on cell size and cell size distribution. FIG. 13 shows average cell size as a function of the exit temperature. At a relatively constant blowing agent concentration, as the temperature decreases, the cell size decreases at an exponential rate. FIGS. 4a, 4b, and 4c shows SEMs and FIG. 5 shows cell size histograms for compositionally identical foams made from melt solutions having similar blowing agent concentrations of approximately 7 to 9 weight %, but formed at three different temperatures. At a temperature of 117° C. the average cell size is 56 µm and the distribution had a polydispersity of 1.60. A decrease in temperature to 99° C. decreased the average cell size to 39 µm, with a polydispersity of 1.80. A further decrease to 96° C. decreased the average cell size to 11 µm, an approximately 4-fold decrease from the average cell size obtained with the 99° C. temperature. Additionally, the distribution of cell sizes became very uniform at the low temperature with a polydispersity of 1.04. FIGS. 6a, 6b, 6c, and 6d and 7 show the same effect for compositionally identical foams over a different temperature range. At similar blowing agent concentrations of 6 to 7 weight %, decreasing exit temperatures of 122° C., 112° C., 107° C. and 101° C. produced average cell sizes of 115, 49, 36, and 28 µm, respectively, and polydispersities of 1.11, 1.02, 1.03, and 1.02, respectively. This aspect of the invention provides a means to create not only a small cell size (less than 200 micrometer), but a uniform cell size distribution.

Figure 14:
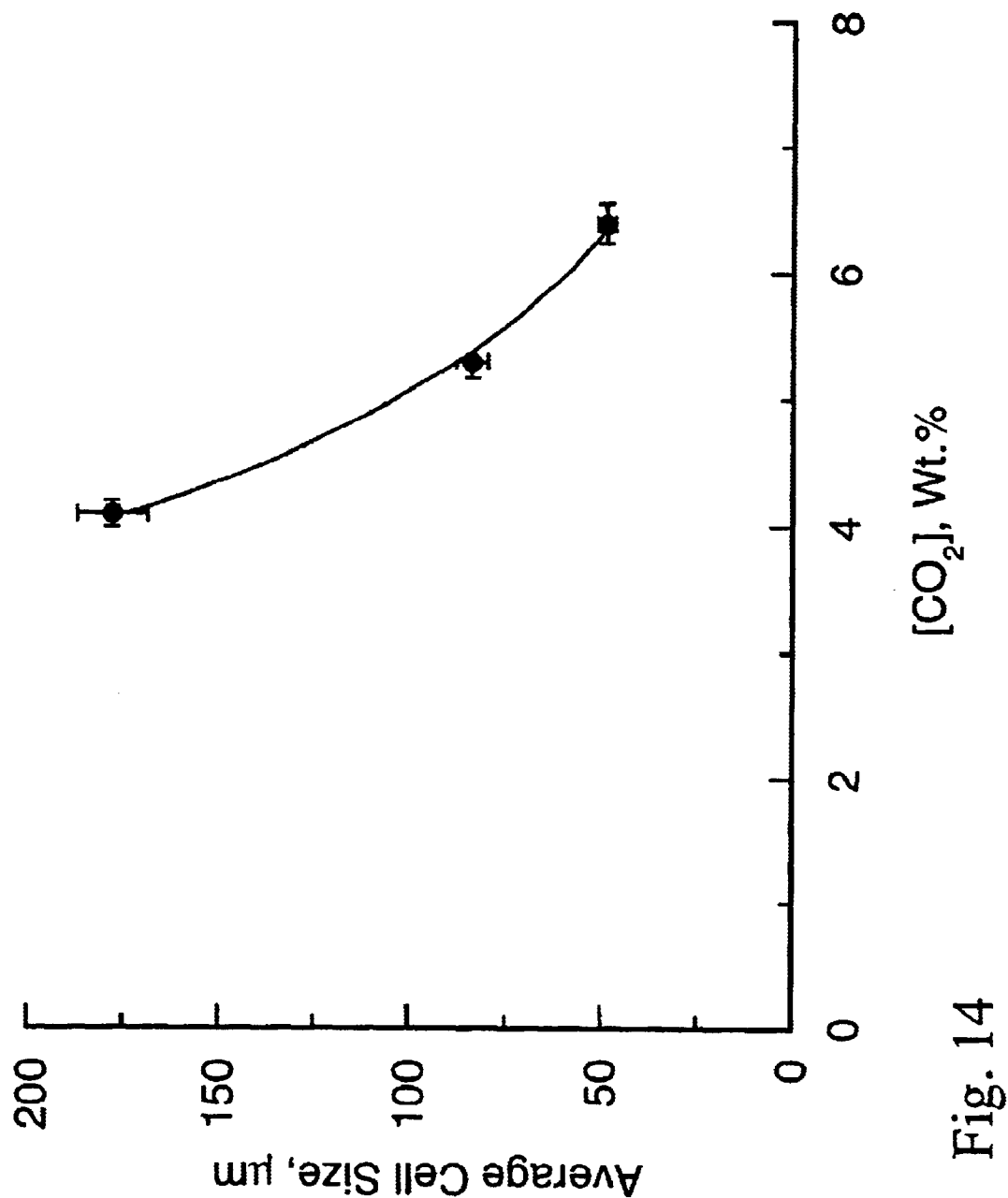
FIG. 14 shows the exponential relationship of average cell size to blowing agent concentration for polystyrene foams comprising PS615 and various $CO_2$ concentrations, made at an exit temperature of 112° C.–118° C., using a tandem extruder process wherein the first extruder was operated at 25 rpm and the second at 5 rpm.

The inventors also found that at a relatively constant exit temperature, a change in blowing agent concentration can affect cell size and cell size uniformity. FIG. 14 shows average cell size as a function of blowing agent concentration at similar temperatures. As blowing agent concentration increases, average cell sizes decrease at an exponential rate. FIGS. 8a, 8b, and 8c and 9 show the effect on a foam of a change in blowing agent concentration at similar temperatures. As the blowing agent concentration increases from 4.4 to 5.7 to 6.2 weight %, the average cell sizes decrease from 178 to 84 to 49 µm and have polydispersities of 1.03, 1.05, and 1.02, respectively. Even though the polydispersities are approximately equivalent for all three foams, it can be seen from FIG. 9 that a higher blowing agent concentration produces a smaller overall range of cell sizes, i.e., a smaller standard deviation. However, it should be noted that at high exit temperatures, as blowing agent concentration increases, the average cell size may decrease even though polydispersity increases. This can occur when the range of cell sizes increases, but the distribution of cell sizes causes the calculated average cell size to decrease.

The blowing agent concentration in the system is primarily controlled by the physical blowing agent and polymer flowrates. However, depending on the operating and exit pressures of the process, the actual solubility of the physical blowing agent in the polymer can change. An increase in pressure will increase solubility, thereby allowing increased $CO_2$ concentration in the melt solution. Therefore, it is important to note that by controlling the pressure in the process, the properties of the foam material can be manipulated by changing the physical blowing agent solubility limit of the polymer. Suitable physical blowing agent concentration typically range from below, to above, the blowing agent's saturation point in the neat polymer of the material being used to make the foam, depending on the desired properties of the resulting foams. Typically, the preferable blowing agent concentration range is 50 to 110% of what the blowing agent's saturation level would be in the neat polymer material.

The pressure of the melt solution in the extruder is dependent on orifice size, amount of blowing agent, polymer flow rate, polymer viscosity, polymer type, and temperature. Decreasing the size of the die exit can increase exit and operating pressures. Decreasing the process and exit temperatures and decreasing blowing agent concentration can result in higher pressures. The lower the blowing agent concentration, the more significant the effect of changing the temperature on the pressure. It should also be noted, that, in general, at higher pressures, a given polymer can dissolve more physical blowing agent.

Figure 15:
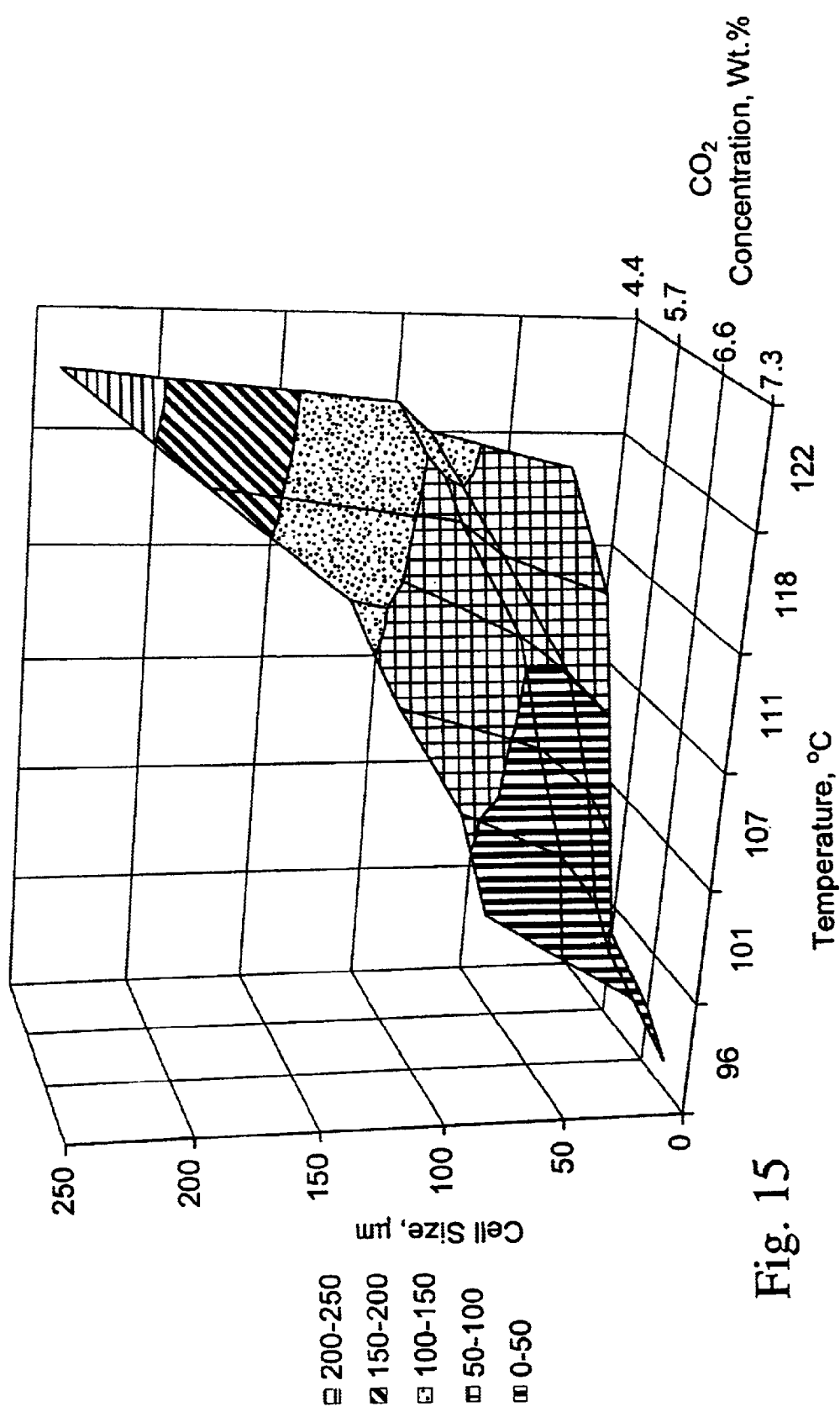
FIG. 15 shows the combined relationships of average cell size to exit temperature and blowing agent concentration for polystyrene foams comprising PS615 and made using a tandem extruder process wherein the first extruder was operated at 25 rpm and the second at 5 rpm.

In general, as the melt solution exits the die, it is preferable to have a large pressure drop over a short distance. Keeping the solution at a relatively high pressure until it exits the die helps to form uniform cell sizes. Maintaining a large pressure drop between the exit pressure and ambient pressure can also contribute to the quick foaming of a melt solution. The lower limit for forming a foam with uniform cells will depend on the critical pressure of the blowing agent being used. In general, the inventors found that for the polymers used in the examples, the lower exit pressure limit for forming acceptably uniform cells is approximately 7 MPa (1000 psi), preferably 10 MPa (1500 psi), more preferably 14 MPa (2000 psi). FIG. 15 illustrates the combined effect of exit temperature and blowing agent concentration on cell sizes for a polystyrene foam. The smallest cell sizes were produced at low exit temperatures and high blowing agent concentrations. However, it is believed that at any given temperature and pressure, there is a blowing agent concentration at and above which polydispersity will increase because the polymer becomes supersaturated with blowing agent and a two phase system is formed.

Figure 16:
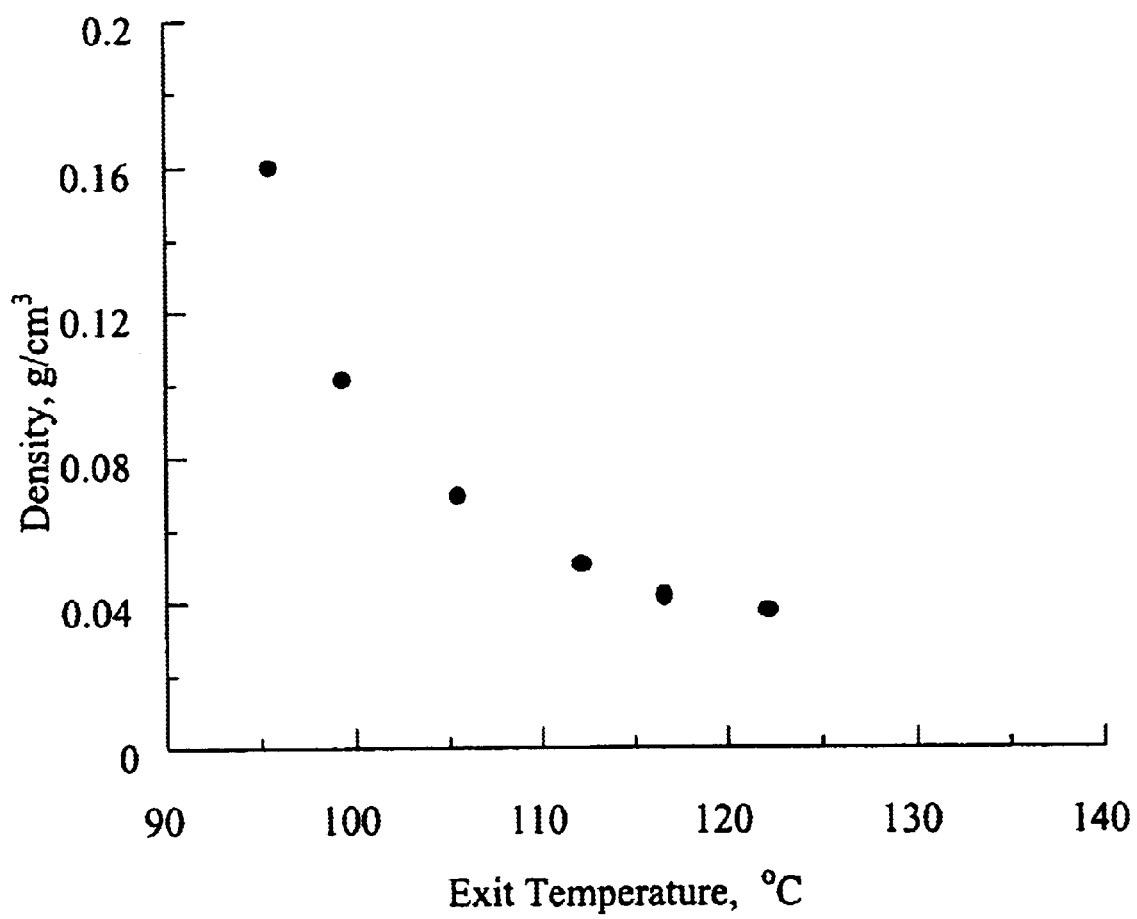
FIG. 16 shows the relationship between foam density and exit temperature for a polystyrene foam comprising PS615 and produced with a 7–9 wt % $CO_2$ concentration using a tandem extruder process wherein the first extruder was operated at 25 rpm and the second at 5 rpm.

The mechanical attributes of foam materials are dependent primarily on their foam density. See Gibson, L. J., Ashby, M. F., Cellular Solids: Structure & Properties, Cambridge University Press, Cambridge, United Kingdom, Second Edition, 1997. The inventors have found a process window that can generate foams with desirable densities and small cell sizes. FIG. 16 shows foam density as a function of exit temperature for a PS615 foam produced using a tandem screw extrusion process. The inventors found that at temperatures less than 125° C., foam density decreased as the exit temperature increased. However at 125° C. this trend will begin to reverse and the density will begin to increase as the temperature increased. This indicates that the inversion temperature for PS615 is approximately 125° C. Because smaller cell sizes and lower polydispersities can be obtained at lower temperatures, operating in the area of the curve below the inversion temperature can yield foam materials with superior mechanical integrity over the foams generated at temperatures above the inversion temperature. Moderate to high foam densities are typically preferred for most applications because a higher foam density generally provides the foam with greater structural integrity.

The optimum exit temperature, exit pressure, and blowing agent concentration for a particular foamable material will depend on a number of factors such as the type and amount of polymer(s) used; the physical properties of the polymers, including viscosity; the solubility of the polymer(s) in the blowing agent; the type and amount of additives used; the thickness of the foam to be produced; whether the foam will be coextruded with another foam or an unfoamed material; and the die gap and die orifice design.

Blowing Agents

A physical blowing agent useful in the present invention is any naturally occurring atmospheric material which is a vapor at the temperature and pressure at which the foam exits the die. The physical blowing agent may be introduced, i.e., injected into the polymeric material as a gas, a supercritical fluid, or liquid, preferably as a a supercritical fluid or liquid, most preferably as a liquid. The physical blowing agents used will depend on the properties sought in the resulting foam articles. Other factors considered in choosing a blowing agent are its toxicity, vapor pressure profile, ease of handling, and solubility with regard to the polymeric materials used. Flammable blowing agents such as pentane, butane and other organic materials, such as hydrofluorocarbons (HFC) and hydrochlorofluorocarbons (HCFC) may be used, but non-flammable, non-toxic, non-ozone depleting blowing agents are preferred because they are easier to use, e.g., fewer environmental and safety concerns. Suitable physical blowing agents include, e.g., carbon dioxide, nitrogen, $SF_6$, nitrous oxide, perfluorinated fluids, such as $C_2F_6$, argon, helium, noble gases, such as xenon, air (nitrogen and oxygen blend), and blends of these materials.

Amorphous Polymers

The polymer matrices of foams of the invention may comprise one or more amorphous polymers. The polymers may be homopolymers or copolymers, including random and block copolymers.

It may be desirable to use two or more miscible amorphous polymers having different compositions to achieve unique foam properties. A wide range of foam physical properties can be obtained by selectively choosing the amorphous polymer component types and concentrations. A particular polymer may be selected based upon the desired properties of a final foam-containing article.

After the amorphous polymer is mixed with the physical blowing agent to form a melt solution, and prior to exiting the die, the temperature of the solution is reduced to an exit temperature that can provide desired cell sizes and cell size distributions preferably at or below 30° C. above the glass transition temperature of the neat polymeric material. A mixture of two or more miscible amorphous polymers will produce a mixture having a single $T_g$. This $T_g$ is typically an average, based on the weight percent of each polymer in the mixture, of the glass transition temperatures of the component polymers. Suitable amorphous polymers include, e.g., polystyrenes, polycarbonates, polyacrylics, polymethacrylics, elastomers, such as styrenic block copolymers, e.g., styrene-isoprene-styrene (SIS), styrene-ethylene/butylene-styrene block copolymers (SEBS), polybutadiene, polyisoprene, polychloroprene, random and block copolymers of styrene and dienes (e.g.,styrene-butadiene rubber (SBR)), ethylene-propylene-diene monomer rubber, natural rubber, ethylene propylene rubber, polyethylene-terephthalate (PETG). Other examples of amorphous polymers include, e.g., polystyrene-polyethylene copolymers, polyvinylcyclohexane, polyacrylonitrile, polyvinyl chloride, thermoplastic polyurethanes, aromatic epoxies, amorphous polyesters, amorphous polyamides, acrylonitrile-butadiene-styrene (ABS) copolymers, polyphenylene oxide alloys, high impact polystyrene, polystyrene copolymers, polymethylmethacrylate (PMMA), fluorinated elastomers, polydimethyl siloxane, polyetherimides, amorphous fluoropolymers, amorphous polyolefins, polyphenylene oxide, polyphenylene oxide-polystyrene alloys, copolymers containing at least one amorphous component, and mixtures thereof.

Pressure Sensitive Adhesives

Pressure Sensitive Adhesives (PSAs) is a distinct category of adhesives and a distinct category of thermoplastics, which in dry (solvent-free) form are aggressively, and permanently, tacky at room temperature. They firmly adhere to a variety of dissimilar surfaces upon mere contact without the need of more than finger or hand pressure. Pressure sensitive adhesives require no activation by water, solvent, or heat to exert a strong adhesive holding force toward such materials as paper, cellophane, glass, wood, and metals. They are sufficiently cohesive and elastic in nature so that, despite their aggressive tackiness, they can be handled with the fingers and removed from smooth surfaces without leaving a residue. PSAs can be quantitatively described using the "Dahlquist criteria" which maintains that the elastic modulus of these materials is less than $10^6$ dynes/cm$^2$ at room temperature. See Pocius, A. V., Adhesion & Adhesives: An Introduction, Hanser Publishers, New York, N.Y., First Edition, 1997.

The polymer matrices of the foams of the invention may comprise one or more pressure sensitive adhesive (PSA). It may be desirable to use two or more PSA polymers having different compositions to achieve unique foam properties. A wide range of foam physical properties can be obtained by selectively choosing the PSA component types and concentrations. A particular polymer may be selected based upon the desired properties of a final foam-containing article.

After the PSA polymer is mixed with the blowing agent to form a melt solution, and prior to exiting the die, the temperature of the solution may be reduced to an exit temperature that can provide the desired cell size and cell size distribution, preferably at or below 100° C. above, more preferably 50° C. above, and most preferably 30° C. above, the glass transition temperature of the neat polymeric material. A mixture of two or more miscible PSA polymers will produce a mixture having a single $T_g$. This $T_g$ is typically an average, based on the weight percent of each polymer in the mixture, of the glass transition temperatures of the component polymers. Mixtures of immiscible PSA components will have a distinct $T_g$ for each individual polymer. When two or more immiscible PSA polymers are used, the exit temperature is preferably at or below 100° C. above, more preferably 50° C. above, and most preferably 30° C. above, the glass transition temperature of the individual polymer component having the highest $T_g$.

Suitable polymers can be adhesive polymers (i.e., polymers that are inherently adhesive), or polymers that are not inherently adhesive but are capable of forming adhesive compositions when compounded with tackifiers. Examples of suitable PSA polymers (as long as they have an appropriate Dahlquist numbers, either inherently or after being tackified) include acrylics, acrylic copolymers (e.g., isooctylacrylate-acrylic acid), amorphous poly-alpha-olefins (e.g., polyoctene, polyhexene, and atactic polypropylene), block copolymer-based adhesives, natural and synthetic rubbers, styrene-butadiene rubber (SBR), silicone adhesives, ethylene-vinyl acetate, siloxanes, and epoxy-containing structural adhesive blends (e.g., epoxy-acrylate and epoxy-polyester blends), acrylic copolymers such as those described in U.S. Pat. No. 5,804,610, incorporated by reference, tackified styrenic block copolymers, polyolefin copolymers, polyureas, polyurethanes, vinyl ethers, polyisobutylene/butyl rubber,ethylene-propylene-diene rubber (EPDM), as well as pressure sensitive adhesives disclosed in copending application Ser. No. 09/091,683, incorporated by reference, and mixtures of any of the foregoing pressure sensitive adhesives.

Tackifiers that may be used include, for example, those listed in the additives section below.

Immiscible Thermoplastic Blends

Immiscible thermoplastic polymer blends may be used for the polymer matrices of the foams of this invention as long as the polymeric materials are suitable for melt extrusion processing. It may be desirable to blend two or more immiscible polymers having different compositions to achieve unique foam properties. A wide range of foam physical properties can be obtained by selectively choosing the blend component types and concentrations. A particular polymer may be selected based upon the desired properties of a final foam-containing article. For example blends of the invention may be made that have tensile strengths greater than 5 MPa.

After the immiscible polymers are mixed with the blowing agent to form a melt solution, and prior to exiting the die, the temperature of the solution may be reduced to an exit temperature that can provide the desired cell size and cell size distribution, preferably at or below 100° C. above, more preferably 50° C. above, and most preferably 30° C. above, the glass transition temperature of the neat polymeric material. A blend of immiscible polymers will have a distinct $T_g$ for each individual polymer component. When two or more immiscible thermoplastic polymers, or a copolymer, are used, the exit temperature is preferably at or below 100° C. above, more preferably 50° C. above, and most preferably 30° C. above, the glass transition temperature of the individual polymer component having the highest $T_g$.

Figure 10C:
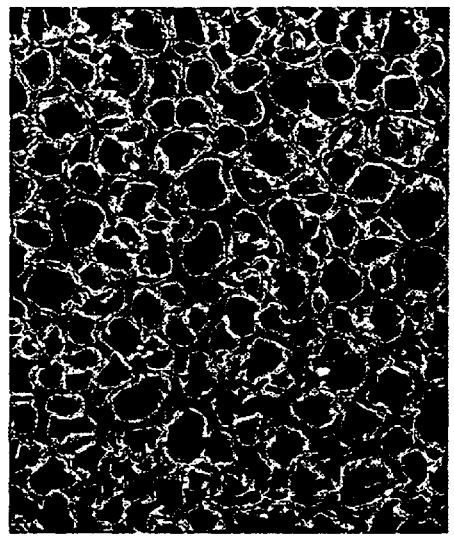
FIGS. 10a, 10b, and 10c show SEM digital image micrographs (parallel to the machine direction) of microcellular foams comprising 100 wt % PS615; 90 wt % PS615 and 10 wt % KD1107 (a styrene-isoprene-styrene di-block/tri-block copolymer available from Shell Chemical Co., Houston, Tex.); and 80 wt % PS615 and 20 wt % KD1107, respectively.
Figure 10B:
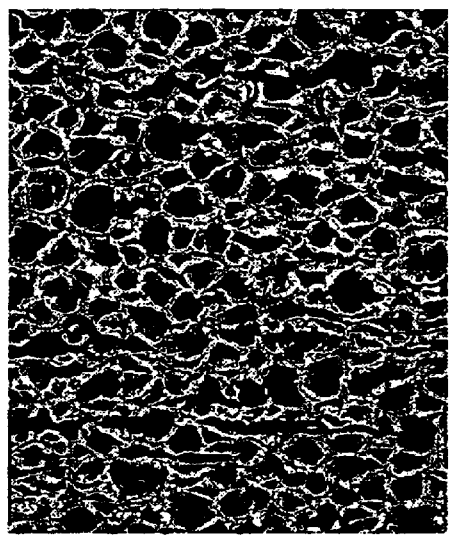
Figure 10A:
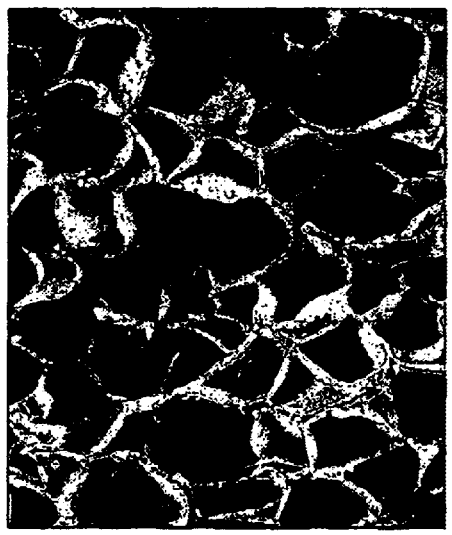

FIGS. 10a, 10b, and 10c illustrate that changing the concentration of one component of an immiscible blend of the present invention from 0 to 10 wt % to 20 wt % can change the cell size and density while maintaining low polydispersity values. For FIGS. 10a, 10b, and 10c, respectively, average cell sizes (standard deviation) were 23, 9, 7 µm; polydispersities were 1.04, 1.05, 1.1; and densities were 0.22, 0.28, and 0.35 g/cc.

Any single component of a blend may comprise greater than zero, but less than 100 weight % of any one polymer component. Suitable blends comprise any two or more amorphous thermoplastic polymers as long as they are immiscible. Pressure sensitive adhesives may also be used to form immiscible blend foams. Combinations of one or more immiscible PSA with one or more immiscible non-PSA may be used.

The composition of the melt mixture will depend on the properties desired in the resulting foam.

Solubility of Blowing Agent with Blend

The present invention provides foams having small cells, uniform cell sizes, and controllable densities, which foams are made from materials that typically would not form foams. As previously discussed, the solubility of a polymer with a blowing agent affects the temperature at which the polymeric material may be foamed. The greater the blowing agent solubility of a polymer, the more plasticized the polymer can become. Increased plasticization allows for processing and foaming at lower temperatures than those required or desired for the neat polymer.

In addition, the inventors have found that by blending a hard-to-foam polymer(s), i.e., those for which the density reduction achieved by foaming is less than 20%, with easy-to-foam polymers, i.e., those for which density reductions achieved by foaming is 20% or greater, they could impart favorable properties of the hard-to-foam material(s) in the resulting blend foam. The inventors also found that for the polymers shown in FIGS. 10a–10c, the density of the foams were typically remained in the range of about 0.1 g/cc to 0.3 g/cc, but as the concentration of the hard-to-foam polymer was increased, a point was reached at which the density of the resulting foam increased. The concentration at which this occurs will depend on the polymers in the blend.

The polymer blend may comprise greater than zero, but less than 100% of a hard-to-foam polymer. Density reductions of about 0.34 to 90%, as compared to an unfoamed material comprising the same materials can be achieved depending on the polymer blend composition and its structure. Generally, as the amount of hard-to-foam polymer is increased, density decreases.

Blend Morphology

As FIGS. 10a, 10b, 10c, 11a, and 11b illustrate, when immiscible polymers are used in blends, the materials and articles produced may comprise foams having a morphology comprising at least two distinct domains, i.e., two phases: a first domain being substantially continuous in nature (the blend matrix) and a second domain being discontinuous or co-continuous and ranging in shape from spherical to fibrillose or schistose in a direction parallel to the extrusion, or machine, direction.

FIGS. 10a, 10b, and 10c show SEM micrographs of small cell immiscible blend foams with different blend compositions of PS615 and KD1107 (100:0; 90:10; 80:20) viewed from a direction parallel to the machine direction. The cell sizes of the samples are very uniform with diameters of approximately 7 to 9 microns.

Figure 11B:
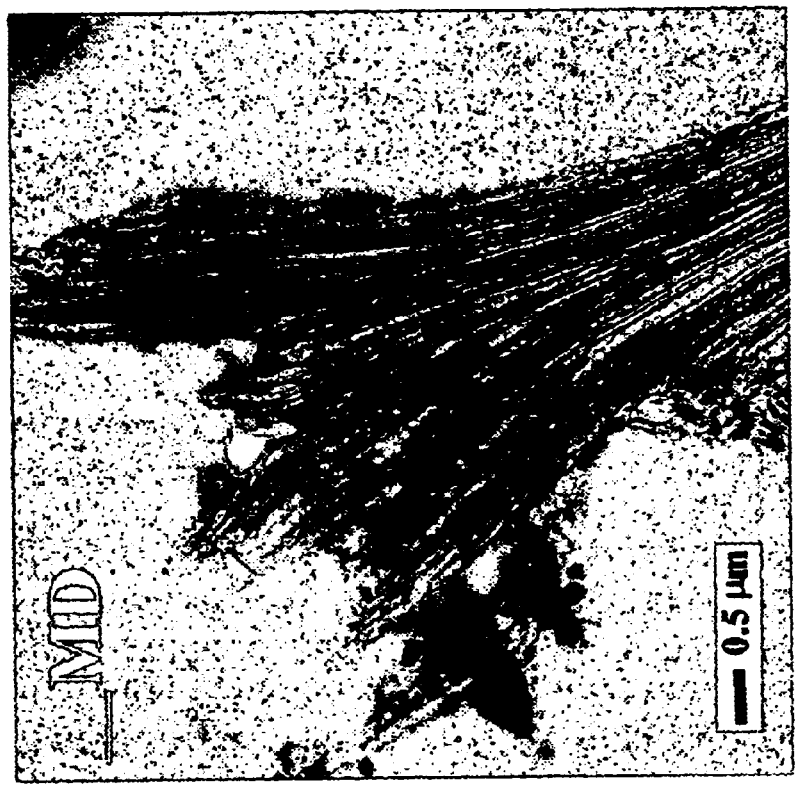
FIGS. 11a and 11b show transmission electron microscope (TEM) digital image micrographs (parallel and perpendicular to the machine direction, respectively) of an immiscible blend of 80:20 PS615:KD1107.
Figure 11A:

FIGS. 11a and 11b, respectively, are SEM midrograph views of a PS615 and KD1107 blend foam from directions both parallel to, and perpendicular to, the machine direction. The dark areas in the PS615 polymer matrix is a fibrillose to schistose (mainly schistose) domain comprised of KD1107 polymer, wherein most of the fibrillose and schistose structures comprising the domain have extremely small thicknesses of less than 0.05 μm. Preferably the thicknesses of the of the fibrillose to schistose structures are less than 5 micrometers, more preferably less than 0.5 micrometers, and most preferably less than 0.05 micrometers.

An oriented spherical or fibrillose to schistose morphology in the foam blends may be formed as the immiscible blended materials are extruded through a die. Die extrusion can impose elongational forces on a foam causing one or both of shear or extensional deformation in the resulting foam. Orientation of the domains may occur as the material passes through the die exit shaping orifice at the exit end of the extruder. Orientation may occur while the blowing agent is still in solution or as the blowing agent expands causing nucleation and cell formation, but prior to the foam being stabilized. Due to the increase in glass transition temperature that occurs upon foaming, as previously discussed, the cells typically are fully formed in their oriented state within seconds or a fraction of a second, typically a fraction of a second, after the material exits the die. The amount and type of polymers used can change the morphology of the resulting foam. Morphology can also be influenced by orientation of the foam cells, i.e., voids.

Figure 12:
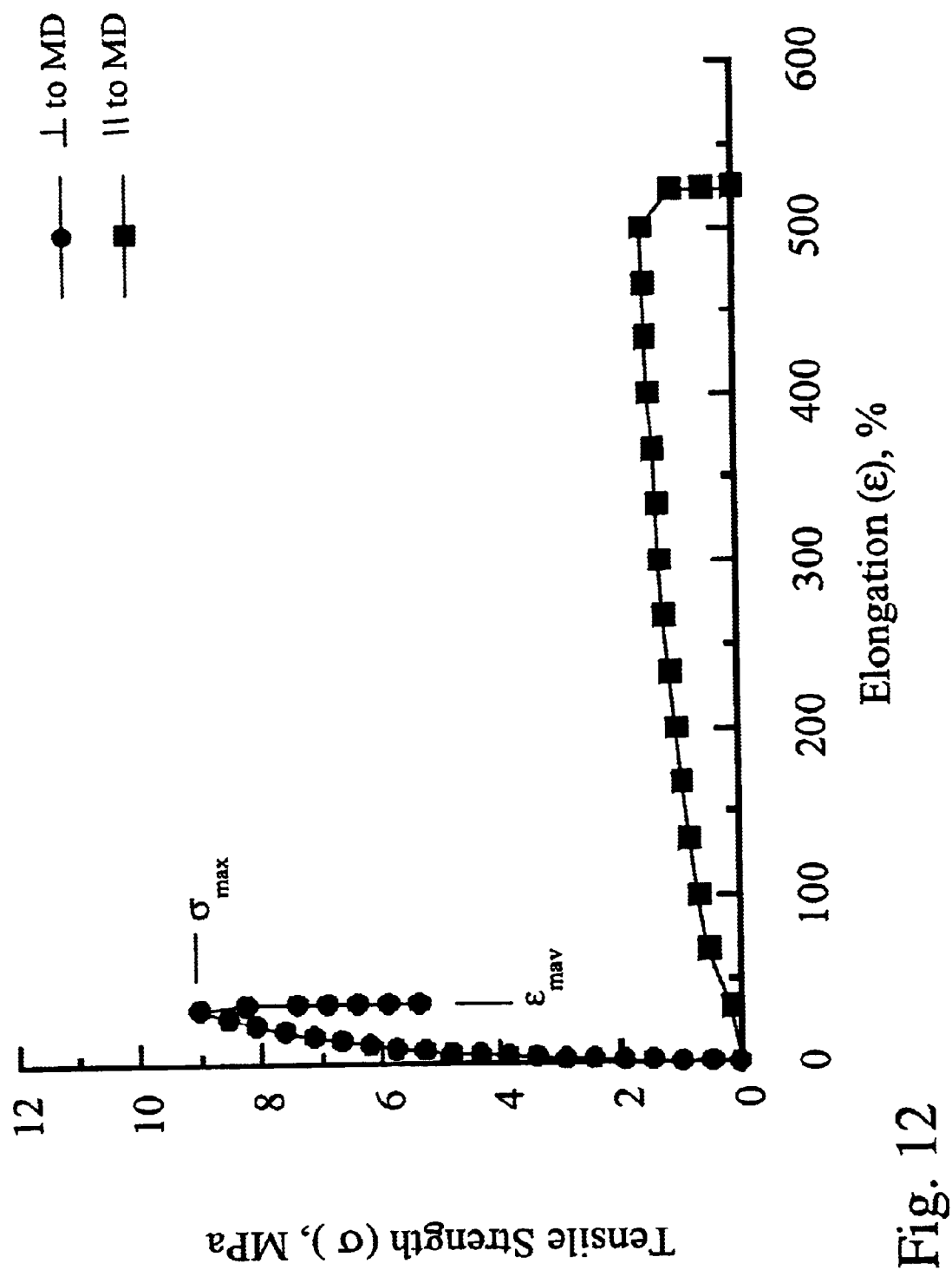
FIG. 12 shows the results of tensile strength (tensile stress) and elongation (tensile strain) tests in directions parallel and perpendicular to the machine direction performed on a foam comprising a blend of 50:50 PS615:KD1107.

The properties of the resulting foam may be isotropic, which typically occurs when the discontinuous phase is spherical; or may be anisotropic, which typically occurs when the discontinuous phase is oriented, e.g., fibrillose to schistose. It is possible to produce blended foams with anisotropic tensile and elongation properties. Anisotropy of tensile and elongation properties is an unusual characteristic wherein the force necessary to break or stretch the foam material or article varies when measured along different axes. That is, the foam material or article displays different tensile and elongation characteristics when pulled in different directions. For example, the inventors were able to produce blended foams that had tensile strengths in a direction parallel to the machine direction that were at least three times greater than tensile strengths in a direction perpendicular to the machine direction. This is illustrated by the data represented in FIG. 12, which shows high tensile and low elongation properties perpendicular to the machine direction and low tensile and high elongation properties parallel to the machine direction. The tensile strength of a foam may be influenced by the type of material(s) used, their concentrations, the length to diameter ratio of the discontinuous domains, and the break elongation of the components.

Coextrudable Materials

The foams of the present invention may be coextruded with other materials including foaming and nonfoaming polymeric materials. The foam of the invention may be any one or more of a multilayered structure, which may include one or more layers of material coextruded with the foam. The coextrudable material may be any polymeric material that can be used in a hot melt process, i.e., any thermoplastic material such as those described herein, including pressure sensitive adhesives.

Additives

The foamable melt mix may also include additives. Examples of suitable additives include tackifiers (e.g., rosin esters, terpenes, phenols, and aliphatic, aromatic, or mixtures of aliphatic and aromatic synthetic hydrocarbon resins), plasticizers (other than physical blowing agents), nucleating agents (e.g., talc, silicon, or $TiO_2$), pigments, dyes, reinforcing agents, solid fillers, hydrophobic or hydrophilic silica, calcium carbonate, toughening agents, flame retardants, antioxidants, finely ground polymeric particles (e.g., polyester, nylon, or polypropylene), expandable microspheres, glass beads, stabilizers (e.g., UV stabilizers), and combinations thereof.

Chemical blowing agents may also be used in the melt mixture. Suitable chemical blowing agents include a sodium bicarbonate and citric acid blend, dinitrosopentamethylenetetramine, p-toluenesulfonyl hydrazide, 4-4'-oxybis(benzenesulfonyl hydrazide, azodicarbonamide (1,1'-azobisformamide), p-toluenesulfonyl semicarbazide, 5-phenyltetrazole, 5-phenyltetrazole analogues, diisopropylhydrazodicarboxylate, 5-phenyl-3,6-dihydro-1,3,4-oxadiazin-2-one, and sodium borohydride.

Semi-crystalline materials may also be added to the melt mixture in amounts of less than 50 volume % of the mixture. Suitable semi-crystalline materials include polyethylene, polypropylene, polymethylpentene, polyisobutylene, polyolefin copolymers, Nylon 6, Nylon 66, polyester, polyester copolymers, fluoropolymers, poly vinyl acetate, poly vinyl alcohol, poly ethylene oxide, functionalized polyolefins, ethylene vinyl acetate copolymers, metal neutralized polyolefin ionomers available under the trade designation SURLYN from E.I. DuPont de Nemours, Wilmington, Del., polyvinylidene fluoride, polytetrafluoroethylene, polyformaldehyde, polyvinyl butyral, and copolymers having at least one semi-crystalline compound.

The additives may be added in amounts sufficient to obtain the desired properties for the foam being produced. The desired properties are largely dictated by the intended application of the foam or foam article.

Articles

The invention features materials and articles that comprise a polymer foam. The foam may be provided in a variety of shapes, including a rod, a tube, a sheet, including a sheet having a patterned profile, etc., depending on the die shape. In some embodiments, e.g., when the foam is provided in the form of a sheet or a tube, the foam will have two major surfaces.

Examination of the foams by electron microscopy reveals that the preferable foam structure is characterized by cell sizes of 2 to 200 $\mu$m, more preferably cell sizes of 5 to 50 $\mu$m. The preferable foam structures may also be characterized by cell size distributions having a polydispersity from 1.0 to 2.0, preferably from 1.0 to 1.5, and most preferably from 1.0 to 1.2.

Foams of the invention that were tested for dielectric properties were shown to have high dielectric strengths and low dielectric constants. The inventors were able to manipulate the dielectric constant by changing foam density. A higher density generally provided a higher dielectric constant.

Layered articles may be made using the coextrusion process of the invention. The layered articles may have a myriad of different properties depending on the materials used and the cell sizes and cell size distributions of the foams in the articles.

The foams comprised of pressure sensitive adhesives can provide adhesive foam articles that do not required the separate application of an adhesive layer.

The foams comprised of blends of immiscible polymers can provide articles with many uses. The anisotropic properties of some of the foam blends can be used advantageously in applications where different properties or degrees of properties are desired in different directions of the article. For example, it can be useful to have an article that may be stretched or broken in one direction, but not another. The ability of some of the blends to be hand-torn in a straight line (i.e., the tear not deviating more than 20°, preferably not more than 10°, from the direction in which the tear is initiated) both parallel and perpendicular to the machine direction could also be used advantageously, such as for a tape substrate.

After the foam material or article has been formed, it may be subjected to further processing. For example, the foam may be subjected to ultraviolet or actinic radiation, an electron beam source, or a thermal, e.g., infra red, source to crosslink the polymeric materials in the foam. The foam material may also be subjected to post-production orientation, lamination, replication, converting, or thermoforming.

EXAMPLES

Test Methods

Foam Density (ASTM D792-86)

Foam samples were cut into 12.5 mm×25.4 mm specimens and weighed on a high precision balance available as Model AG245 from Mettler-Toledo, Greifensee, Switzerland. The volume of each sample was obtained by measuring the mass of water displaced at room temperature (25° C.). Assuming the density of water at 25° C. to be 1 g/cm$^3$, the volume of each sample was calculated using Archimede's principle. The density of the foam was obtained by the quotient of the mass and volume. Accuracy of this measurement is ±0.005 g/cm$^3$.

Foam Cell Size

Scanning electron microscopy was performed on all the foam samples using a scanning electron microscope available as model JSM-35C from JEOL, Peabody, Mass., operated at 5 and 10 kV. The samples were prepared by freezing in liquid nitrogen for 2–5 minutes and fracturing. A thin palladium-gold coating was evaporated on the samples to develop a conductive surface. The diameters of the foam cells were measured using the digital SEM micrographs and UTHSCSA Image Tool for Windows Software (Version 1.28, University of Texas, San Antonio, Tex.). The diameters of over 100 cells were measured and recorded. The average cell diameter (x) and standard deviation ($\sigma$) of the cell diameter was calculated using the Image Tool Software.

Foam Uniformity—Polydispersity

The number ($N_i$) of foam cells with diameter ($x_i$) for each foam sample was measured using digital SEM images and the UTHSCSA Image Tool software, as described above.

The number average diameter, $\bar{x}_n$, of the sample was calculated using the following relationship, $$\bar{x}_n = \frac{\sum_i N_i x_i}{\sum_i N_i} \tag{1}$$

where $N_i$ is the number of cells with diameter $x_i$. The weight average diameter, $\bar{x}_w$, of the foam sample can also be calculated using the relationship below, $$\bar{x}_w = \frac{\sum_i N_i x_i^2}{\sum_i N_i x_i} \tag{2}$$

where $N_i$ is the number of cells with diameter $x_i$. The polydispersity index, P, is the ratio of the weight average cell diameter and the number average cell diameter as shown below, $$P = \frac{\bar{x}_w}{\bar{x}_n} \tag{3}$$

For polydisperse systems the amount by which P deviates from unity is a measure of the variation of the cell diameters. In the event that all the cell diameters have the same diameter, P would be one. Such a sample is said to be monodisperse. See Hiemenz, P. C., Polymer Chemistry, Marcel Dekker Inc., New York, N.Y., 1984, pp. 34–55.

Tensile Strength and Elongation

The foam tensile and elongation properties, as defined in ASTM D638–95, were measured at room temperature using a testing device available as Model 55R1122, from Instron, Canton, Mass. The samples were first conditioned at 21° C. and 50% humidity for 5 days. The samples were then cut into 130 mm×12.5 mm specimens. The thickness of each specimen was measured using a digital linear gauge available as Model EG-233 from Ono Sokki, Tokyo, Japan, and recorded. The samples were tested using gauge lengths of 51 mm at a rate of 254 mm/min until failure. The strength ($\sigma$) was measured as a function of elongation ($\in$). The maximum values of $\sigma$ and $\in$ are reported as $\sigma_{max}$ and $\in_{max}$, respectively.

Dielectric Constant and Loss Tangent

The dielectric constant and loss tangent (tan $\delta$) were obtained by cutting a 12.5 mm×12.5 mm foam specimen and placing the sample in a 4.8 mm (5/16") diameter dielectric test fixture available as HP16453A from Hewlett-Packard, Palo Alto, Calif. The capacitance based measurements were obtained using a HP4291 A impedance materializer at frequencies of 1–1800 Megahertz (MHz).

Dielectric Strength

Dielectric strength measurements were obtained using a Phenix Technologies (Accident, Maryland) Model 6100-510149 dielectric tester with the ends of 6.35 mm diameter brass rods as the capacitor plates. Voltage ramp rates were 500 volts/second (v/s). All the measurements were run in a fluorinated fluid available as FLURINERT FC-40 from 3M Company, St. Paul, Minn.

Transmission Electron Microscopy

Transmission Electron Microscopy (TEM) samples were prepared by cutting large foam samples while immersed in liquid nitrogen. These samples were further trimmed in the shape of a triangle with one very long and thin point. The samples were then embedded into an electrical resin available as SCOTCHCAST electrical resin #5 from 3M Company, St. Paul, Minn., and thermally cured for 24 hours. Sections with varying thickness (85–95 nanometers) were ultramicrotomed using a Leica Reichert Ultracut T with FCS (Wetzlar, Germany) at −40° C. using a diamond knife. The microtomed samples were placed on a 200 mesh copper grid with carbon stabilized formvar (a polyvinyl aldehyde) substrates, brought to room temperature and exposed to osmium tetraoxide ($OsO_4$) for 2 hours. TEM micrographs were collected using a JEOL 200CX microscope at 200 kV.

Materials Used

| Material | Description | Tg ° C. |
|---|---|---|
| Dow PS615 | A polystyrene available from Dow Chemical Co., Midland, MI | 105 |
| $CO_2$ | Carbon dioxide gas, at 830 psig, available from Oxygen Services Company, St. Paul, MN | N/A |
| EASTAR PETG 6763 | A copolyester, available from Eastman Chemical Co., Kingsport, TN | 81 |
| KRATON D1107 | a styrene-isoprene-styrene di-block/tri-block copolymer available from Shell Chemical Co., Houston, TX | iso = −73 sty = 105 |
| TENITE 1550P | a low density polyethylene available from Eastman Chemical Co., Kingsport, TN | −125 |
| VECTOR 4211 | a styrene-isoprene-styrene di-block/tri-blockcopolymer available from DexCo., Houston, TX | iso = −73 sty = 105 |
| HL-2647 | A rubber pressure-sensitive adhesive available from H.B. Fuller Chemical Co., St. Paul, MN | iso = −12.5 sty = 105 |
| Dow PE 6806 | a linear low density polyethylene available from Dow Chemical Co., Midland, MI | −125 |
| IOA/AA | Isooctyl acrylate - acrylic acid copolymer made using pouch polymerization process described in U.S. Pat. No. 5,804,610 | IOA = −40 AA = 100 |

Tandem Single Screw Extrusion Process 10

Polymer pellets were fed into a gravimetric batch blender 12 available as Model ACW-T from ConAir-Franklin, Media, Pa. Any additional solid components were fed into separate chambers in the gravimetric batch blender. The desired ratio of components was programmed into the blender controller. The blender fed the components to a first single screw extruder 14, an NRM single screw extruder available from Davis-Standard, Pawcatuck, Conn. The extruder 14 had 6 zones, a 64 mm (2.5") diameter, a length to diameter ratio of 36:1 and a two-stage screw having a compression ratio of 3:1, available as Model PS-31 from Plastic Engineering Associates, Inc., Boca Raton, Fla. The extruder 14 was typically operated at 25 rpm with an increasing temperature profile from zone 1 to zone 6, with temperatures set for each zone of extruder 14, which created increasing operating pressures from zone 1 to zone 6.

A physical blowing agent (PBA), typically $CO_2$, was injected into extruder 14 between zones 5 and 6, between two blister rings on the screw, by a laboratory injection system 16 available as Model 567 from Sencorp Systems Inc., Hyannis, Mass. The physical blowing agent injection rates were controlled to concentrations between 1 and 20 weight % of the total polymer flowrate. The polymer-PBA mixture was mixed to form a melt solution then conveyed through a 25 mm diameter transfer pipe 18 to a second single screw extruder 20, a 89 mm diameter (3.5") NRM Davis-Standard single screw extruder. The extruder 20 had 6 zones, a length to diameter ratio of 30:1, and a screw having distributive mixing elements along substantially the entire length of the screw, available as Model SFS-43 from Plastic Engineering Associates, Inc.

Extruder 20 was typically operated at 5 rpm with a decreasing temperature profile from zone 1 to zone 6. Temperatures were set for each of zones 1 to 6 with zone 6 having the desired exit temperature. The pressure of the blowing agent entering extruder 14 from injection system 16 was adjusted to maintain the blowing agent concentration as the downstream temperatures in extruder 20 were changed. The pressure in extruder 20 was maintained at a level that would prevent nucleation until the melt solution exited die 22. Die 22 was attached to the exit end of extruder 20. The shape of the exit shaping orifice of the die used depended on the desired shape of the extruded foam. The melt mixture was fed to die 22 at a constant flowrate, which created a pressure at the entrance of die 22.

As the melt solution exited the die and was exposed to atmospheric pressure of approximately 0.104 MPa (15 psi) the PBA expanded and nucleation and cell growth occurred, forming a foamed material 24 from the melt solution. The foamed material 24 optionally may be passed through a nip roll 26 and onto a winder 28.

Single Twin Screw Extruder Process 40

Polymer pellets were fed through a gravimetric solids feeder 42 available as model T-35 from Ktron America, Pitman, N.J. into a 40 mm diameter co-rotating twin screw extruder 44 available as model ZE-40 from Berstorff, Florence, Ky. The twin screw extruder 44 had 10 zones, and a length to diameter ratio of 40:1. Extruder 44 was typically operated at 55 rpm. The screw in the extruder comprised forward kneading segments in Zones 3 and 6, a reverse kneading segment in Zone 4, pin mixers in Zones 7, 8, 9, and 10, and a blister ring between Zones 4 and 5. The remaining Zones comprised conveying elements. A physical blowing agent, typically $CO_2$, was metered into Zone 5 using laboratory injection system 46, available as model 567 from Sencorp Systems, Inc., Hyannis, Mass. The screw design was configured to quickly melt and knead the polymer in the initial zones of the extruder to create a polymer seal prior to injection of the physical blowing agent. The design of the screw downsteam of the blowing agent injection was to facilitate mixing and distribution of the blowing agent into the polymer. The extruder was operated with a generally decreasing temperature profile. After the melt mixture passed through the extruder, it entered a 10.3 cm³/revolution polymer melt pump 48, available from Normag, Santa Clarita, Calif., which controlled the flow rate of the mixture to an exit shaping die 50. The die was typically a 4.8 mm capillary die. As the melt mixture exited the die, the physical blowing agent expanded causing nucleation and cell formation whereby the melt solution foamed, forming circular foam rods 52. The foam rods were then broken into pieces and collected.

Examples 1–4

Examples 1–4 illustrate the effect of varying exit temperature on foam properties.

In Example 1, the tandem single screw extrusion process was used to make a foam comprising an amorphous thermoplastic polymeric material (DOW PS615). The temperature profile of extruder 14 for zones 1 to 6, respectively, was 192° C., 204° C., 232° C., 232° C., 227° C., and 227 ° C. The physical blowing agent (PBA), $CO_2$, was injected at a pressure of approximately 17 MPa (2448 psi), which was approximately 3 MPa (500 psi) greater than the operating pressure in extruder 14. The temperature profile of extruder 20 for zones 1 to 6, respectively, was 216° C., 216° C., 176° C., 122° C., 121° C., and 121° C. The temperature of die 22 was 121° C. The exit temperature of the melt solution was 117° C. The exit temperature of the melt solution was measured by a thermocouple extending into the melt stream in the last zone of the extruder. The temperature of the extrudate at the exit of the die was determined by infrared analysis. The extrudate temperature at the die exit was typically within approximately 1° C. of the exit temperature. Die 22 was a 25 mm wide slit die having a gap of 0.61 mm. The exit pressure of the extrudate was measured by a transducer in the last zone of the extruder. Other operating conditions and measured properties are shown in Table 1.

Examples 2–4 were made by the method described in Example 1 except the temperatures in zones 4 to 6 of extruder 20 and die 22 were reduced to 110° C., 104° C., 99° C., and 99° C., respectively, and the exit temperatures and pressures differed as shown in Table 1. Other operating conditions are also shown in Table 1.

Foam density, cell size, and polydispersity for examples 1–4 are shown in Table 1.

TABLE 1

| Ex. | Polymer Composition | Polymer Flowrate (kg/hr) | $CO_2$ Flowrate (kg/hr) | $CO_2$ Concentration (wt %) | $T_{exit}$ (° C.) | $T_{exit}$–Tg (° C.) | $P_{exit}$ (MPa) | Density (g/cc) | Cell size Ave. (μm) | Cell size Std. Dev. (μm) | P |
|---|---|---|---|---|---|---|---|---|---|---|---|
| 1 | 100% PS615 | 20.2 | 1.54 | 7.3 | 117 | +12 | 10.8 | 0.04 | 56 | 45 | 1.61 |
| 2 | 100% PS615 | 19.9 | 1.59 | 7.4 | 106 | +0.6 | 12.3 | 0.07 | 55 | 43 | 1.5 |
| 3 | 100% PS615 | 19.4 | 1.59 | 7.6 | 99 | −6 | 12.8 | 0.10 | 39 | 35 | 1.8 |
| 4 | 100% PS615 | 16.8 | 1.59 | 8.7 | 96 | −9 | 14.8 | 0.16 | 11 | 2 | 1.04 |
| 5 | 100% PS615 | 19.5 | 1.25 | 6.0 | 122 | +17 | 10.4 | 0.04 | 115 | 39 | 1.11 |
| 6 | 100% PS615 | 19.0 | 1.25 | 6.2 | 112 | +7 | 12.8 | 0.04 | 49 | 7 | 1.02 |
| 7 | 100% PS615 | 18.1 | 1.25 | 6.4 | 107 | +2 | 14.9 | 0.06 | 36 | 7 | 1.03 |
| 8 | 100% PS615 | 17.0 | 1.25 | 6.8 | 101 | −4 | 16.7 | 0.11 | 28 | 4 | 1.02 |
| 9 | 100% PS615 | 19.7 | 1.82 | 8.4 | 80 | −25 | 13.8 | 0.22 | 19 | 5 | 1.07 |

As seen in Table 1, by comparing examples 1–4 and examples 5–8, as the exit temperature is reduced while physical blowing agent concentrations stayed relatively constant, foam density increased and average cell diameter decreased. Example 9 illustrates that the process will work at an exit temperature that is 25 degrees below the glass transition temperature of the neat polymer.

Examples 10–14

Examples 10–14 illustrate the effect of varying blowing agent concentration on foam properties.

Examples 10–13 were made in a manner similar to Example 1 except the temperature in extruder 20 was held constant through zones 4 to 6 at 121° C., 121° C., 116° C. and 127° C., respectively, while blowing agent concentrations were changed. Example 14 was made under the same conditions as Example 1. Other operating conditions are shown in Table 2. The foams in examples 10–14 were produced in the shape of a solid rope using a 4.8 mm capillary die.

Foam density, cell size, and polydispersity for examples 10–14 are shown in Table 2.

TABLE 2

| Ex. | Polymer Composition | Flowrate (kg/hr) | CO$_2$ Flowrate (kg/hr) | Conc. (wt %) | $T_{exit}$ (° C.) | $T_{exit}$–$T_g$ (° C.) | $P_{exit}$ (MPa) | Density (g/cc) | Cell size Ave. ($\mu$m) | Cell size Std. Dev. ($\mu$m) | P |
|---|---|---|---|---|---|---|---|---|---|---|---|
| 10 | 100% PS615 | 17.1 | 0.79 | 4.4 | 118 | +13 | 16.6 | 0.04 | 178 | 30 | 1.03 |
| 11 | 100% PS615 | 17.0 | 1.02 | 5.7 | 117 | +12 | 14.7 | 0.056 | 84 | 19 | 1.05 |
| 12 | 100% PS615 | 19.0 | 1.25 | 6.2 | 112 | +7 | 12.8 | 0.041 | 49 | 7 | 1.02 |
| 13 | 100% PS615 | 19.4 | 1.36 | 6.6 | 120 | +15 | 9.9 | 0.066 | 84 | 39 | 1.21 |
| 14 | 100% PS615 | 20.2 | 1.59 | 7.3 | 117 | +12 | 10.8 | 0.073 | 56 | 45 | 1.61 |

As seen in Table 2, with a relatively constant exit temperature, an increase in blowing agent concentration generally results in a decrease in average cell diameter and low polydispersities except an increase in polydispersity is shown at higher blowing agent concentrations.

Example 15–25

Examples 15–25 illustrate the properties of foams made from a blend of two immiscible polymeric materials.

Each example was made in a manner similar to Example 1 except 1) under different operating conditions as shown in Table 3, 2) using a 32 mm diameter single spider annular die available as Model 567 from Sencorp Systems, Inc. and 3) with different temperature profiles. Because PS615 had the highest $T_g$ of the polymers used, it was used to calculate the appropriate exit temperature range.

For each of examples 15, 16, 17, 18, 19, 20, and 21, the temperature profile of extruder 14 for zones 1 to 6 was 193° C., 204° C., 232° C., 233° C., 227° C. and 227° C., respectively; the temperature profile of extruder 20 for zones 1 to 6 was 216° C., 216° C., 193° C., 99° C., 99° C. and 99° C., respectively.

For example 22 the temperature profile of extruder 14 for zones 1 to 6 was 193° C., 205° C., 232° C., 232° C., 227° C. and 227° C., respectively; the temperature profile of extruder 20 for zones 1 to 6 was 216° C., 216° C., 193° C., 116° C., 116° C. and 116° C., respectively.

For examples 23 and 24, the temperature profile of extruder 14 for zones 1 to 6 was 193° C., 204° C., 232° C., 232° C., 227° C. and 227° C., respectively; the temperature profile of of extruder 20 for zones 1 to 6 was 216° C., 216° C., 193° C., 116° C., 116° C. and 116° C., respectively.

For example 25, the temperature profile of extruder 14 for zones 1 to 6 was 193° C., 204° C., 232° C., 232° C., 227° C. and 227° C., respectively; the temperature profile of extruder 20 for zones 1 to 6 was 216° C., 216° C., 193° C., 104° C., 104° C. and 104° C., respectively.

Foam density, cell size, and polydispersity for examples 15–25 are shown in Table 3. Dielectric constant, loss tangent (tan δ) (reported in milli units($10^{-3}$)), tensile strength (measured in volts/mil, i.e., volts/25 micrometers), and anisotropic properties for examples 15–20 are shown in Table 3A.

TABLE 3

| Ex. | Polymer Composition | Flowrate (kg/hr) | CO$_2$ Flowrate (kg/hr) | Conc. (wt %) | $T_{exit}$ (° C.) | $T_{exit}$–$T_g$ (° C.) | $P_{exit}$ (MPa) | Density (g/cc) | Cell size Average ($\mu$m) | Cell size Std. Dev. ($\mu$m) | P |
|---|---|---|---|---|---|---|---|---|---|---|---|
| 15 | 100% PS615 | 18.7 | 1.25 | 6.3 | 96 | −9 | 15.5 | 0.22 | 23 | 5 | 1.04 |
| 16 | 90% PS615/ 10% Kraton D 1107 | 18.7 | 1.25 | 6.3 | 96 | −9 | 18.1 | 0.27 | 10 | 3 | 1.07 |
| 17 | 80% PS615/ 20% Kraton D 1107 | 18.7 | 1.25 | 6.3 | 96 | −9 | 19.9 | 0.35 | 7 | 2 | 1.1 |
| 18 | 70% PS615/ 30% Kraton D 1107 | 14.8 | 1.25 | 7.8 | 93 | −12 | 19.9 | 0.29 | 15 | 3 | 1.04 |
| 19 | 60% PS615/ 40% Kraton D 1107 | 14.8 | 1.25 | 7.8 | 94 | −11 | 19.9 | 0.30 | 34 | 7 | 1.04 |
| 20 | 50% PS615 50% Kraton D 1107 | 15.1 | 1.25 | 7.6 | 94 | −11 | 17.9 | 0.42 | 9 | 3 | 1.09 |
| 21 | 40% PS615/ 60% Kraton D 1107 | 15.3 | 1.25 | 7.6 | 94 | −11 | 17.7 | 0.35 | 16 | 5 | 1.07 |
| 22 | 10% PS615/ 90% Kraton D 1107 | 17.4 | 1.25 | 6.7 | 101 | −5 | 13.8 | 0.72 | 39 | 13 | 1.1 |

TABLE 3-continued

| | | Polymer | $CO_2$ | | | | | | Cell size | | |
|---|---|---|---|---|---|---|---|---|---|---|---|
| Ex. | Composition | Flowrate (kg/hr) | Flowrate (kg/hr) | Conc. (wt %) | $T_{exit}$ (° C.) | $T_{exit}$–Tg (° C.) | $P_{exit}$ (MPa) | Density (g/cc) | Average (μm) | Std. Dev. (μm) | P |
| 23 | 90% PS615/ 10% Tenite 1550P | 14.8 | 1.25 | 7.8 | 111 | +6 | 17.6 | 0.15 | 21 | 16 | 1.6 |
| 24 | 90% PS615/ 10% PETG 6763 | 18.1 | 1.25 | 6.5 | 111 | +6 | 15.4 | 0.05 | 36 | 11 | 1.08 |
| 25 | 70% PS615/ 30% Vector 4211 | 13.0 | 1.25 | 8.9 | 101 | –4 | 22.3 | 0.23 | 36 | 8 | 1.05 |

TABLE 3A

| Ex. | Comp | dielectric constant (@900MHz) | tan δ (mu) | dielectric strength (v/mil) | tensile strength parallel to machine direction (MPa) | Tensile strength ratio parallel MD/ perpendicular MD | MD elong. % | elong. ratio perpendicular MD/ parallel MD |
|---|---|---|---|---|---|---|---|---|
| 15 | 100% PS615 | 1.26 | 0.36 | 499 | 8.7 | 6.7 | 5.0 | 0.05 |
| 16 | 90% PS615 10% Kraton D 1107 | 1.38 | 0.15 | 321 | 12.0 | 6.2 | 13.4 | 0.31 |
| 17 | 80% PS615/ 20% Kraton D 1107 | 1.50 | 0.14 | 472 | 14.8 | 13.4 | 13.6 | 0.40 |
| 18 | 70% PS615/ 30% Kraton D 1107 | 1.93 | 0.29 | 546 | 17.8 | 11.9 | 20.0 | 1.25 |
| 19 | 50% PS615/ 50% Kraton D 1107 | 2.45 | 0.17 | 608 | 11.0 | 1.2 | 20.0 | 6.2 |
| 20 | 40% PS615/ 60% Kraton D 1107 | 3.05 | 1.74 | 574 | 11.4 | 1.9 | 23.3 | 6.4 |

As seen in Table 3, immiscible thermoplastic blends can be used to make foams having small and uniform cell sizes. Table 3A shows that the foams may also exhibit useful properties such as a dielectric constant between 1.25 and 3, high dielectric strength, high tensile strength, and anisotropic strength and elongation properties.

Example 26–30

Examples 26–30 illustrate the properties of foams made with pressure-sensitive adhesive polymeric materials.

The pressure sensitive adhesives used in examples 26 to 28 were a pressure-sensitive adhesive composition prepared by mixing 85 parts of IOA (isooctyl acrylate), 15 parts of AA (acrylic acid), 0.15 part 2,2 dimethoxy-2-phenylacetophenone (IRGACURE 651 available from Ciba Geigy) and 0.03 parts of IOTG (isooctyl thioglycolate). The composition was placed into packages measuring approximately 10 cm by 5 cm by 0.5 cm thick packages as described in Assignee's co-pending patent application Ser. No. 08/919756. The packaging film was a 0.0635 thick ethylene vinylacetate copolymer (VA-24 Film available from CT Film of Dallas, Tex.) The packages were immersed in a water bath and at the same time exposed to ultraviolet radiation at an intensity of 3.5 milliwatts per square centimeter and a total energy of 1627 milliJoules per square centimeter as measured in NIST units to form a packaged pressure-sensitive-adhesive. The resulting adhesive had an IV (intrinsic viscosity of about 1.1 deciliters/gram, Mw of $5.6 \times 10^5$ g/mol, and Mn of $1.4 \times 10^5$ g/mol.reacted in an ethylene vinyl acetate pouch according to the method described in U.S. Pat. No. 5,804,610.

The pressure sensitive adhesives used in example 29 was made in the same manner as those for examples 26–28, but the IOA/AA ratio was 80:20.

Examples 26 to 28 were made as in Example 1 except under different operating conditions as shown in Table 4. For examples 26 and 27, the temperature profile of extruder 14 for zones 1 to 6 was 121.1° C., 160° C., 176.7° C., 176.7° C., 176.7° C. and 176.7° C., respectively; the temperature profile of extruder 20 for zones 1 to 6 was 176.7° C., 176.7° C., 160° C., 148.9° C., 148.9° C. and 148.9° C., respectively.

In addition, the samples were made using a 32 mm diameter single spider annular die available as Model 567 from Sencorp Systems, Inc., Hyannis, Minn., which produced the foam in the form of a hollow tube. Within 30 minutes of being extruded, the pressure sensitive adhesive foams were exposed to an electron-beam source to crosslink the polymers of the foam. The foams were placed on a carrier web and passed at 7.6 m/min through an accelerated electron source available as ESI ELECTROCURTAIN from Energy Sciences, Inc., Woburn, Mass. A nitrogen atmosphere was maintained in the accelerator. The electron beam accelerator was operated at 300 keV and dosages for examples 26, 27, and 28 were 60, 120, and 180 kiloGrays, respectively.

Examples 29 and 30 were made in the same manner as examples 26–28, but were not exposed to an electron beam source. In addition, example 30 used a different PSA (40% PS615/60% KD1107).

Foam density, cell size, and polydispersity, for examples 26–30 are shown in Table 4.

TABLE 4

| | | Polymer | $CO_2$ | | | | | | Cell size | | |
|---|---|---|---|---|---|---|---|---|---|---|---|
| Ex. | Composition | Flowrate (kg/hr) | Flowrate (kg/hr) | Conc. (wt %) | $T_{exit}$ (° C.) | $T_{exit}$–Tg (° C.) | $P_{exit}$ (MPa) | Dose (kGy) | Density (g/cc) | Ave. (μm) | Std. Dev. (μm) | P |
| 26 | 85% IOA/ 15% AA | 10.8 | 0.68 | 5.9 | 141 | +41 | 9.2 | 60 | 0.83 | 28 | 8 | 1.09 |
| 27 | 85% IOA/ 15% AA | 10.8 | 0.68 | 5.9 | 141 | +41 | 9.2 | 120 | 0.74 | 24 | 12 | 1.22 |
| 28 | 85% IOA/ 15% AA | 10.8 | 0.68 | 5.9 | 141 | +41 | 9.2 | 189 | 0.72 | 19 | 9 | 1.2 |
| 29 | 80% IOA/ 20% AA | 8.9 | 1.59 | 15.1 | 142 | +41 | 7.5 | 0 | 0.84 | 43 | 33 | 1.57 |
| 30 | 40% PS615/ 60% Kraton D1107 | 15.3 | 1.25 | 7.0 | 94 | −11 | 17.6 | 0 | 0.35 | 16 | 5 | 1.07 |

As seen in Table 4 pressure sensitive adhesive materials can be used to make foams having small and uniform cell sizes.

Examples 31–33

Examples 31–33 illustrate the method using a single twin screw extruder. In Examples 31–33, single twin screw extruder process 40, previously described, was used to make the foamed articles.

For example 31, extruder 44 had a temperature profile for zones 1 to 10 of 215° C., 205° C., 202° C., 172° C., 135° C., 121° C., 113° C., 84° C., 78° C., and 85° C., respectively. The exit temperature of the melt solution was 108° C. For example 32, extruder 44 had a temperature profile for Zones 1 to 10 of 214° C., 204° C., 202° C., 174° C., 135° C., 125° C., 112° C., 93° C., 88° C., and 102° C., respectively. The exit temperature of the melt solution was 125° C. For example 33, extruder 44 had a temperature profile for Zones 1 to 10 of 215° C., 205° C., 201° C., 175° C., 122° C., 130° C., 131° C., 110° C., 111° C., and 120° C., respectively. The exit temperature of the melt solution was 139° C. In these examples, the melt solution was extruded through a 4.8 mm diameter capillary die.

Foam density, cell size, polydispersity for examples 31–33 are shown in Table 5.

Examples 34–41

Examples 34–41 illustrate coextrusion of foamed materials with polymeric outer layers or "skins." The foam cores for examples 34 to 41 were processed using the tandem extrusion method previously described with the operating conditions shown in Table 6. For examples 37–39, extruder 20 was operated at 15 rpm. The polymeric skins in examples 37 and 38 comprised a tacky polymeric material available as HL-2647 from HB Fuller, St. Paul, Minn. The polymeric skin precursor material was processed using a 32 mm diameter single screw extruder, having 3 zones and a length to diameter ratio of 24:1, available from Killion, Pawcatuck, Conn. For examples 34–36, the temperatures in Zones 1–3 of this extruder were set at 121° C., 121° C., and 121° C. For example 37, the temperatures in Zones 1–3 of this extruder were set at 121 ° C., 160° C., and 154° C. For examples 38, the temperatures in Zones 1–3 of this extruder were set at 121° C., 160° C., and 149° C. For examples 39–41, the temperatures in Zones 1–3 of this extruder were set at 138° C., 215.6° C., and 204° C. For examples 34 to 41, respectively, the Killion extruder was operated at 8.7, 74, 40, 25.3, 50.3, 0, 81, 15 rpm, which varied the skin thickness. Coextruded articles were made using a two layer tubular die having an outlet diameter of 4.8 mm. The foamable melt solution was fed to the center portion of the two layer die and the polymeric (unfoamed) skin material was fed to the outer

TABLE 5

| | | Polymer | $CO_2$ | | | | | Cell size | | |
|---|---|---|---|---|---|---|---|---|---|---|
| Ex. | Composition | Flowrate (kg/hr) | Flowrate (kg/hr) | Conc. (wt %) | $T_{exit}$ (° C.) | $T_{exit}$–Tg (° C.) | $P_{exit}$ (MPa) | Density (g/cc) | Average (μm) | Std. Dev. (μm) | P |
| 31 | 100% PS615 | 9.1 | 1.36 | 13.0 | 108 | +3 | 9.3 | 0.11 | 50 | 28 | 1.31 |
| 32 | 100% PS615 | 9.1 | 1.36 | 13.0 | 125 | +20 | 7.4 | 0.05 | 27 | 8 | 1.08 |
| 33 | 100% PS615 | 9.1 | 1.36 | 13.0 | 139 | +34 | 6.1 | 0.03 | 165 | 89 | 1.14 |

As shown by Table 5, a twin screw extruder may be used to form foam materials having small and uniform cells. However, a single extruder provides a shorter distance in which to melt and mix the solution and reduce its temperature to the exit temperature.

portion of the die resulting in a two layer tubular structure exiting the die. The extruded tubes were cut and collected.

Foam cell size, and polydispersity for examples 34–41 are shown in Table 6.

TABLE 6

| | | | CO₂ | | | | | | | Core cell size | | |
| | Core | | | Concen- | | | | Skin | | | Std. | |
| Ex. p | Com-position | Flowrate (kg/hr) | Flowrate (kg/hr) | tration (wt %) | T$_{exit}$ (° C.) | T$_{exit}$–Tg (° C.) | P$_{exit}$ (Mpa) | Com-position | Flowrate (kg/hr) | Ave. (μm) | Dev. (μm) | P |
|---|---|---|---|---|---|---|---|---|---|---|---|---|
| 34 | 100% PS615 | 20.4 | 1.25 | 5.8 | 111 | +6 | 21.8 | 100% HL-2647 | 2.4 | 35 | 8 | 1.04 |
| 35 | 100% PS615 | 20.4 | 1.25 | 5.8 | 111 | +6 | 11.0 | 100% HL-2647 | 4.5 | 42 | 10 | 1.04 |
| 36 | 100% PS615 | 20.4 | 1.25 | 5.8 | 111 | +6 | 20.4 | 100% HL-2647 | 1.4 | 35 | 8 | 1.05 |
| 37 | 100% PS615 | 9.6 | 1.04 | 9.8 | 96 | −9 | 12.1 | 100% PS615 | 5.6 | 22 | 14 | 1.18 |
| 38 | 100% PS615 | 9.6 | 1.04 | 9.8 | 96 | −9 | 23.8 | 100% PS615 | 5.2 | 20 | 12 | 1.32 |
| 39 | 100% PS615 | 9.6 | 1.04 | 9.8 | 96 | −9 | 18.4 | none | 0 | 19 | 4 | 1.04 |
| 40 | 100% PS615 | 10 | 1.25 | 11.0 | 107 | +2 | 23.8 | 100% PE 6806 | 4.6 | 40 | 11 | 1.08 |
| 41 | 100% PS615 | 10 | 1.25 | 11.0 | 107 | +2 | 15.1 | 100% PE 6806 | 3.1 | 17 | 4 | 1.04 |

As shown by Table 6, coextruded articles having small and uniform cells can be made using a process of the invention.

What is claimed is:

1. A continuous method for making a foam material comprising:
   (1) mixing at least one amorphous thermoplastic polymeric material and at least one physical blowing agent in an apparatus having an exit shaping orifice at a temperature and pressure sufficient to form a melt solution wherein the blowing agent is uniformly distributed throughout the polymeric material;
   (2) reducing the temperature of the melt solution at the exit of the apparatus to an exit temperature that is less than 15° C. above the glass transition temperature of the neat polymeric material while maintaining the melt solution at a pressure sufficient to keep the blowing agent in solution; and
   (3) passing the solution through said exit shaping orifice and exposing the solution to atmospheric pressure, whereby the blowing agent expands causing nucleation and cell formation resulting in the melt solution foaming and solidifying at or about the time it exits the shaping orifice.

2. The method of claim 1 further comprising controlling one or both of the blowing agent concentration and the exit temperature of the melt solution to produce a foam having uniform cell sizes such that the polydispersity of the cell size distribution is from 1.0 to 2.0.

3. The method of claim 1 further comprising controlling one or both of the blowing agent concentration and the exit temperature of the melt solution to produce a foam having uniform cell sizes such that the polydispersity of the cell size distribution is from 1.0 to 1.5.

4. The method of claim 1 further comprising controlling one or both of the exit temperature and blowing agent concentration to produce a foam having cell sizes of 2 to 200 μm.

5. The method of claim 1 further comprising controlling one or both of the exit temperature and blowing agent concentration to produce a foam having cell sizes of 5 to 50 μm.

6. The method of claim 1 further comprising adding a semi-crystalline polymer to the melt solution in an amount of less than 50 volume percent.

7. The method of claim 1 further comprising the step of crosslinking the foam.

8. The method of claim 1 wherein the physical blowing agent is in a supercritical state.

9. The method of claim 1 further comprising controlling the density of the foam by selecting an exit temperature below the inversion temperature.

10. A continuous method for making a foam material comprising:
    (1) mixing at least one amorphous thermoplastic pressure sensitive adhesive polymeric material and at least one physical blowing agent in an apparatus having an exit shaping orifice at a temperature and pressure sufficient to form a melt solution wherein the blowing agent is uniformly distributed throughout the polymeric material;
    (2) reducing the temperature of the melt solution at the exit of the apparatus while maintaining the melt solution at a pressure sufficient to keep the blowing agent in solution; and
    (3) passing the solution through said exit shaping orifice and exposing the solution to atmospheric pressure, whereby the blowing agent expands causing nucleation and cell formation resulting in the melt solution foaming and solidifying at or about the time it exits the shaping orifice.

11. The method of claim 10 wherein the temperature is reduced to a temperature at or below 100° C. above the glass transition temperature of the polymeric material.

12. The method of claim 10 further comprising controlling one or both of the blowing agent concentration and the exit temperature of the melt solution to produce a foam having uniform cell sizes such that the polydispersity of the cell size distribution is from 1.0 to 2.0.

13. The method of claim 10 further comprising controlling one or both of the exit temperature and blowing agent concentration to produce a foam having cell sizes of 2 to 200 μm.

14. The method of claim 10 further comprising the step of crosslinking the foam.

15. The method of claim 10 wherein the foam material has cell sizes of about 5 μm to about 50 μm.

* * * * *

UNITED STATES PATENT AND TRADEMARK OFFICE
CERTIFICATE OF CORRECTION

PATENT NO. : 6,638,985 B2
DATED : October 28, 2003
INVENTOR(S) : Gehlsen, Mark D.

It is certified that error appears in the above-identified patent and that said Letters Patent is hereby corrected as shown below:

Column 6,
Line 30, please delete "causes" and insert in place thereof -- causing --.
Line 33, please delete "resulting" and insert in place thereof -- results --.

Column 9,
Line 7, please delete "isolates" and insert in place thereof -- isolate --.

Column 10,
Lines 64-65, please delete "concentration" and insert in place thereof
-- concentrations --.

Column 12,
Line 7, please delete the second occurrence of "a".

Column 13,
Line 51, please delete "numbers" and insert in place thereof -- number --.

Column 15,
Line 4, please delete "were" following "foams".
Line 34, please delete "midrograph" and insert in place thereof -- micrograph --.
Line 42, please delete the second occurrence of "of the".

Column 17,
Line 34, please delete "required" and insert in place thereof -- require --.
Line 44, please delete "hand-tom" and insert in place thereof -- hand-torn --.

Column 21,
Line 15, please delete "downstream" and insert in place thereof -- downstream --.

Column 23,
Line 23, please delete "Example" and insert in place thereof -- Examples --.

Column 24,
Line 26, please delete the second occurrence of "of".

Column 25,
Line 45, please delete "Example" and insert in place thereof -- Examples --.

UNITED STATES PATENT AND TRADEMARK OFFICE
CERTIFICATE OF CORRECTION

PATENT NO.    : 6,638,985 B2
DATED         : October 28, 2003
INVENTOR(S)   : Gehlsen, Mark D.

It is certified that error appears in the above-identified patent and that said Letters Patent is hereby corrected as shown below:

Column 28,
Line 47, please delete "outlet" and insert in place thereof -- outer --.

Signed and Sealed this

Twenty-seventh Day of July, 2004

JON W. DUDAS
*Acting Director of the United States Patent and Trademark Office*